US012717181B2

(12) United States Patent
Wei et al.

(10) Patent No.: US 12,717,181 B2
(45) Date of Patent: Aug. 25, 2026

(54) ZONAL ILLUMINATION WITH PHOTONIC CIRCUITS FOR DISPLAYS

(71) Applicant: Meta Platforms Technologies, LLC, Menlo Park, CA (US)

(72) Inventors: Guohua Wei, Redmond, WA (US); Peter Topalian, Seattle, WA (US); Min Chul Shin, Bellevue, WA (US); Risheng Cheng, Redmond, WA (US); Zhujun Shi, Redmond, WA (US); Zhaoning Yu, Redmond, WA (US); Jonathan Robert Peterson, Woodinville, WA (US); Zhimin Shi, Bellevue, WA (US); Giuseppe Calafiore, Woodinville, WA (US); Heqing Huang, Bronx, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 310 days.

(21) Appl. No.: 18/405,521

(22) Filed: Jan. 5, 2024

(65) Prior Publication Data

US 2025/0130447 A1 Apr. 24, 2025

Related U.S. Application Data

(60) Provisional application No. 63/592,514, filed on Oct. 23, 2023.

(51) Int. Cl.
*G02F 1/03* (2006.01)
*G02B 27/01* (2006.01)
(Continued)

(52) U.S. Cl.
CPC ....... *G02F 1/0327* (2013.01); *G02B 27/0172* (2013.01); *G02F 1/0311* (2013.01);
(Continued)

(58) Field of Classification Search
CPC ........ G02F 1/225; G02F 1/011; G02F 1/0311; G02F 1/0327; G02F 1/212; G02F 1/035; G02B 27/0172
See application file for complete search history.

(56) References Cited

U.S. PATENT DOCUMENTS

2010/0259804 A1* 10/2010 Buschbeck .......... G03H 1/2286 359/34
2023/0418105 A1* 12/2023 Shi .................... G02F 1/133524

FOREIGN PATENT DOCUMENTS

EP 3599541 A1 1/2020
EP 3926233 A1 12/2021
(Continued)

OTHER PUBLICATIONS

International Search Report and Written Opinion for International Application No. PCT/US2024/049165, mailed Dec. 23, 2024, 14 pages.

(Continued)

*Primary Examiner* — Michael P Mooney
(74) *Attorney, Agent, or Firm* — Greenberg Traurig, LLP

(57) ABSTRACT

In some examples, a device may include a backlight unit configured to illuminate a display. In some examples, a light source may direct light into an active photonic circuit. The active photonic circuit may include optical switches controllable to distribute the light to illuminate display zones. An active photonic circuit may include an arrangement of optical switches configured to allow particular zones to be raster scanned, for example, using light distribution and outcoupling further using a passive photonic circuit. The illumination intensity for each zone may be controlled using the optical switches and/or with variation of the light source intensity. In some examples, the illumination intensity for each zone can be varied based on the displayed content, allowing improved contrast ratios. In some examples, all (Continued)

zones may be illuminated simultaneously with a zonal illumination intensity based on displayed content. Other devices, methods, systems, and computer-readable media are also disclosed.

20 Claims, 22 Drawing Sheets

(51) Int. Cl.
*G02F 1/035* (2006.01)
*G02F 1/21* (2006.01)

(52) U.S. Cl.
CPC .............. *G02F 1/035* (2013.01); *G02F 1/212* (2021.01); *G02B 2027/0118* (2013.01)

(56) References Cited

FOREIGN PATENT DOCUMENTS

| | | | |
|---|---|---|---|
| EP | 4407366 | A1 | 7/2024 |
| WO | 2024156919 | A1 | 8/2024 |

OTHER PUBLICATIONS

Ioannis P., et al., “The Quantum Light Chip Technology,” Proceedings of the International Display Workshops, Dec. 15, 2022, vol. 29, 03 Pages.

* cited by examiner

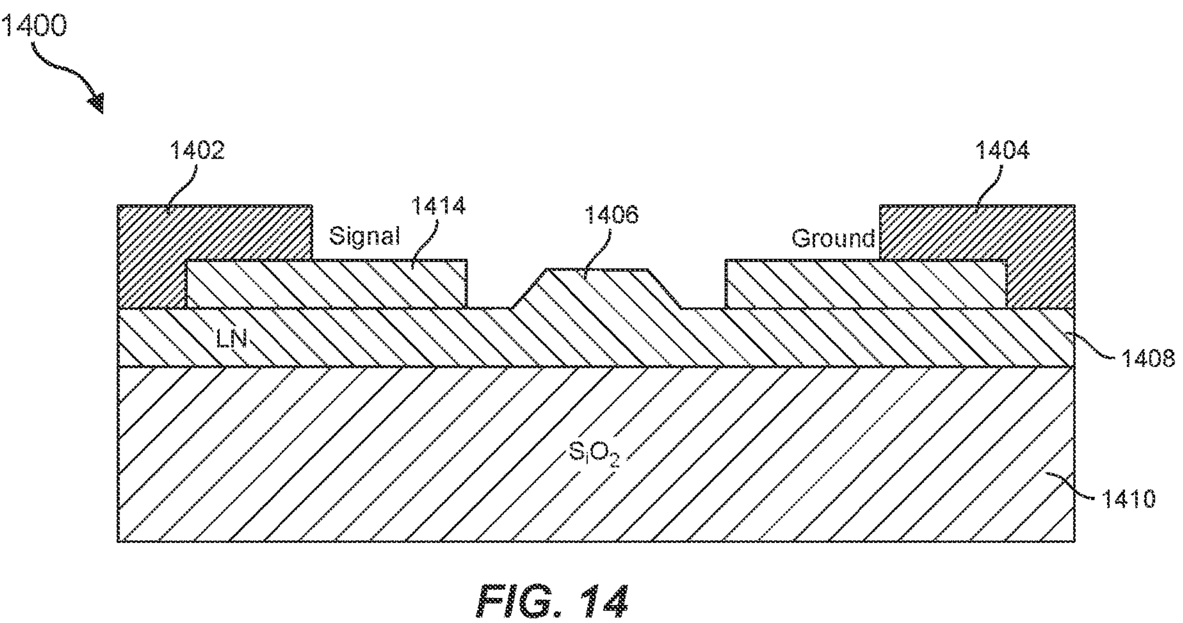
FIG. 14
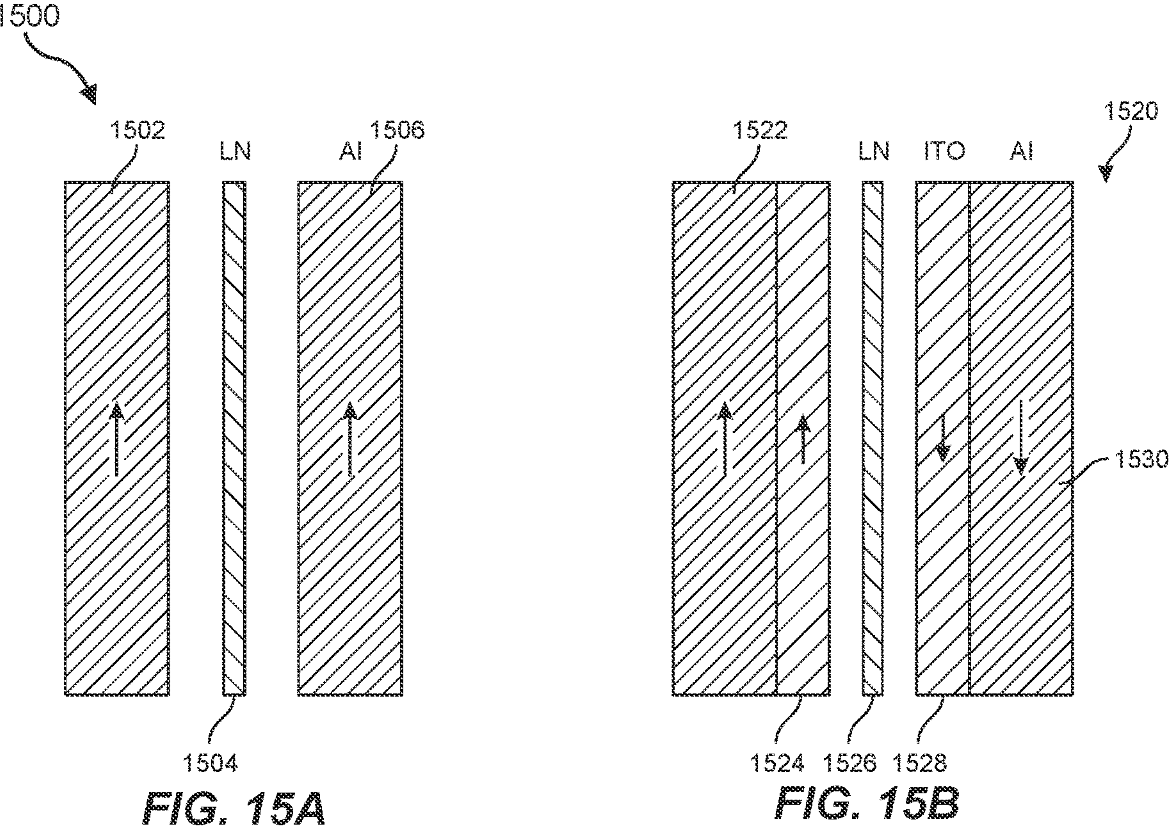
FIG. 15A
FIG. 15B

ZONAL ILLUMINATION WITH PHOTONIC CIRCUITS FOR DISPLAYS

CROSS-REFERENCE TO RELATED APPLICATION

This application claims the benefit of priority under 35 U.S.C. § 119 (e) of U.S. Provisional Application No. 63/592,514, filed Oct. 23, 2023, the contents of which are incorporated herein by reference in their entirety.

BRIEF DESCRIPTION OF DRAWINGS

The accompanying drawings illustrate a number of exemplary embodiments and are a part of the specification. Together with the following description, the drawings illustrate various examples of the present disclosure.

FIG. 14 shows a cross-sectional view of a power-efficient electrooptic (EO) MZI configuration, according to some examples.

FIGS. 15A and 15B show top view of a portion of an MZI modulator, according to some examples.

Figure 1:
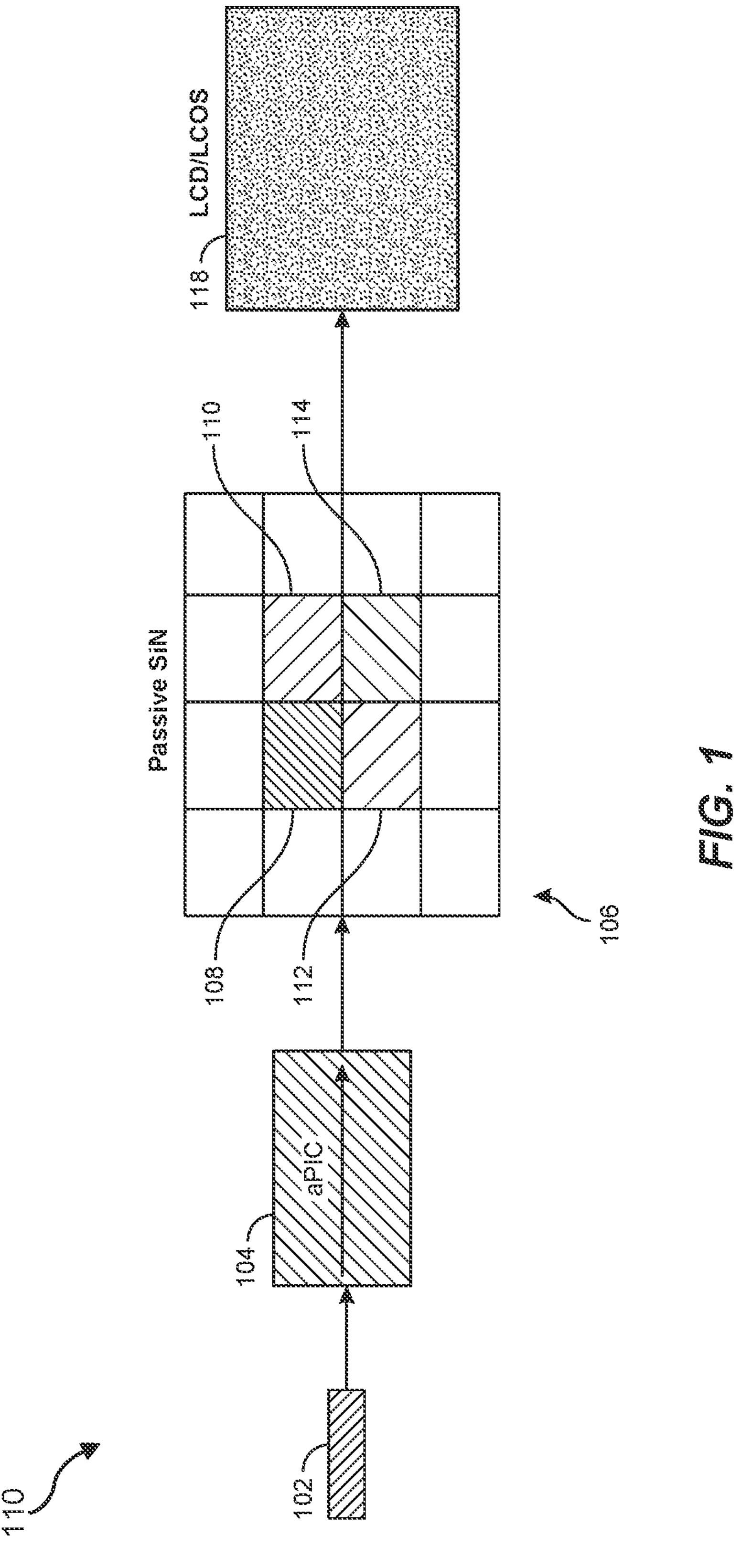
FIG. 1 shows example device including a light source, an active photonics circuit and a passive photonics circuit including light out-couplers, according to some examples.

Throughout the drawings, identical reference characters and descriptions may indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

Augmented reality and/or virtual reality (AR/VR) devices such as headsets, glasses, and the like may include a display configured to provide virtual or augmented reality elements. In augmented reality (AR), the AR image elements may be combined with light from the external environment around the user (e.g., via a passthrough). An AR/VR device may include an electronic display configured to show augmented reality interface to a user when the user wears and operates the device. An example display assembly may include a liquid-crystal-based display and a display backlight. Because wearable devices such as headsets must have a small form factor in order to be comfortably worn and typically operate off of battery power rather than constraining a user's movement with a wired power source, efficient power usage is crucial for such devices. By setting illumination levels for zones of the display based on the images being displayed and/or the user's gaze rather than providing bright, even illumination for the entire display at all times, the systems described herein may conserve power usage in AR/VR devices and/or provide higher contrast imagery.

In some examples, a backlight for an AR/VR device may include a photonics circuit configured to illuminate the display using light received from one or more light sources. For example, a backlight may use a photonics integrated circuit to illuminate a liquid crystal display (LCD). In some examples, a photonic circuit may distribute laser radiation to illuminate a plurality of display zones, for example, through one or more waveguides.

Zonal illumination allows increased power efficiency and/or a higher contrast ratio of a displayed image. In some examples, illumination of the display zones may be raster scanned, as described in more detail below.

In some examples, analog zonal illumination may be achieved in which all zones are illuminated with a modulated light intensity based on the displayed contents. A device may include at least one active photonic integrated circuits (APIC), allowing light to be actively modulated and redistributed between, for example, waveguides of a photonic circuit. Examples include integrated active PIC and passive PIC circuits.

In some examples, a display backlight may include at least one laser and a photonics circuit (e.g., a photonic integrated circuit, PIC) configured to illuminate various backlight zones of the display. For examples, light (e.g., laser radiation) may be distributed from one or more light sources using waveguides of the photonics circuit. In some examples, light out-coupler elements may be located near the center of each illuminated zone. The light intensity within each zone may be controlled using active optical components within the waveguides, control of light source intensity, or by actively adjusting light distribution between waveguides.

In some examples, a backlight may include a control circuit (sometimes referred to as an electronics layer), a photonic circuit (e.g., a PIC), and a display interface. The backlight may include a backlight unit (BLU) or other display backplane used to provide display illumination. The control circuit may, for example, control the operation of one or more components, such as light sources, active optical components, pixel switching, or any other display assembly component. In this context, a display assembly may include one or more of a display, an associated backlight, and/or display driver electronics.

As mentioned above, for portable devices such as a head-mounted AR/VR devices, power consumption is an important factor due to the limited battery capacity available for AR/VR devices. Illumination is a major part of the power consumption for liquid crystal displays (LCDs), and LCOS (liquid crystal on silicon) display. For AR devices, contents can be sparse for most of the use cases, such that illuminating the entire display may not be power efficient. Zonal illumination may only illuminate zones of the display used to display AR content (when and where content is displayed) to save power.

For front-lit or backlit LCDs, the display contrast may be limited by a polarization extinction ratio between the polarization films and stray light that is not controlled or modulated by the display. If the entire display is illuminated, dark pixels are not totally dark (zero transmission) when the polarization extinction ratio is not infinite, limiting the contrast of LCD.

In some examples, a display illumination architecture includes a photonic circuit (e.g., a photonic integrated circuit or PIC). Illumination may be a flood illumination, zonal illumination or pixelated illumination over at least part of the display or over the entire display. In some examples, the photonic circuit may include a passive photonic circuit and the display pixels are all illuminated at the same time regardless of the displayed contents. In some examples, the photonic circuit may be an active photonic circuit, and zonal illumination may be adjusted based on the content shown on the corresponding zone of the display.

Examples may allow one or more of the following advantages. Power consumption may be reduced for display assemblies including a backlight, such as LCDs, or a front-lit for LCOS displays. Reduced power consumption is advantageous for AR/VR devices, as the power budget may be low. Reduced power consumption may allow one or more of reduced battery weight (a particular advantage for head-mounted devices), increased battery life, improved AR waveguide nonuniformity correction, increased contrast ratios for LCD displays such as LCOS displays, and increased illumination efficiency for LED or laser illuminated displays.

FIG. 1 shows an example device 100, including a light source 102, an active photonics circuit 104, a passive photonics circuit 106 and light out-couplers 108, 110, 112, and 114. Light from the out-couplers may be used to illuminate the display 118.

Light sources 102 may include lasers (e.g., a laser diode, LD), a superluminescent light emitting diode (SLED), or a light-emitting diode (LED, such as a semiconductor LED or an organic light emitting diode). The active photonic circuit 104, such as an active PIC (aPIC), may be configured to modulate and distribute the light to each display zone. The passive photonic circuit 106 (e.g., a passive photonic integrated circuit, PIC) may include out-couplers that may emit light from the waveguides of the passive photonic circuit towards the display 118. The display may include an LCD panel, or an LCOS panel.

Figure 2:
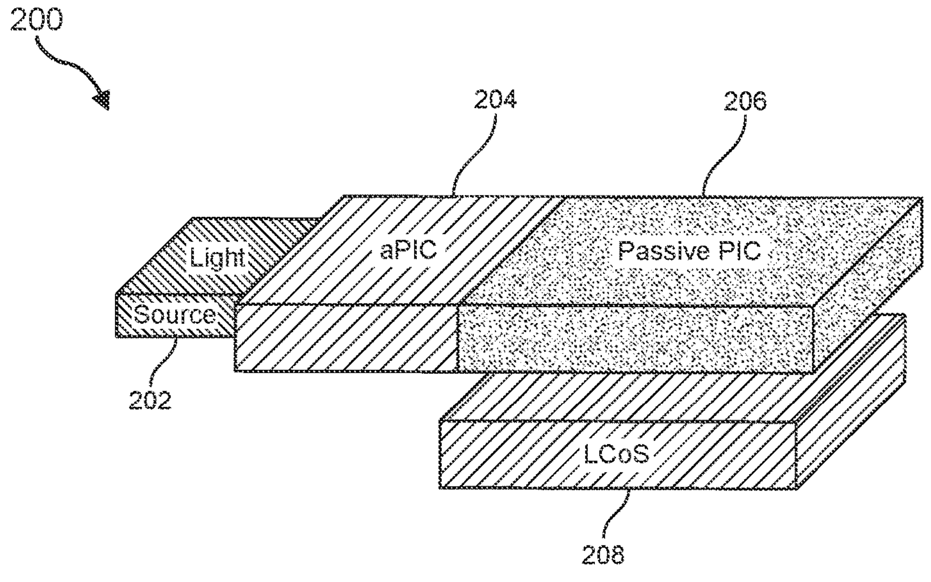
FIG. 2 shows an example display assembly, according to some examples.

FIG. 2 shows an example display assembly 200 including a light source 202, active photonic circuit 204, passive photonic circuit 206, and display 208 (e.g., an LCOS display). In some examples, the light source 202 may be integrated with the other components. In some examples, the light source 202 may be a separate component configured to direct light into the active photonic circuit 204, for example, into one or more waveguides of the active photonic circuit 204.

Figure 3:
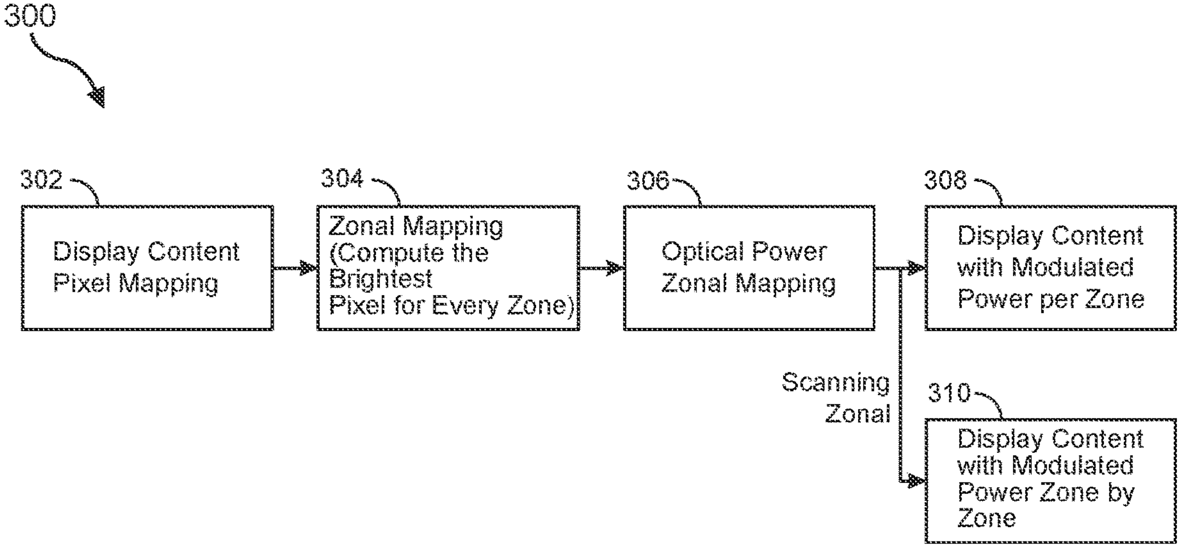
FIG. 3 illustrates an example approach including pixel mapping, according to some examples.

FIG. 3 shows an example method according to some examples. The method 300 includes pixel mapping of the display components (302), zonal mapping of the display components (304), output power zonal mapping (306), and displaying the image content with a spatially varying backlight illumination intensity (308). A display assembly may use an alternative operational mode, for example, a scanning approach. A scanning mode approach may include displaying content with the associated backlight intensity modulated according to the displayed content of each zone (310).

Figure 4:
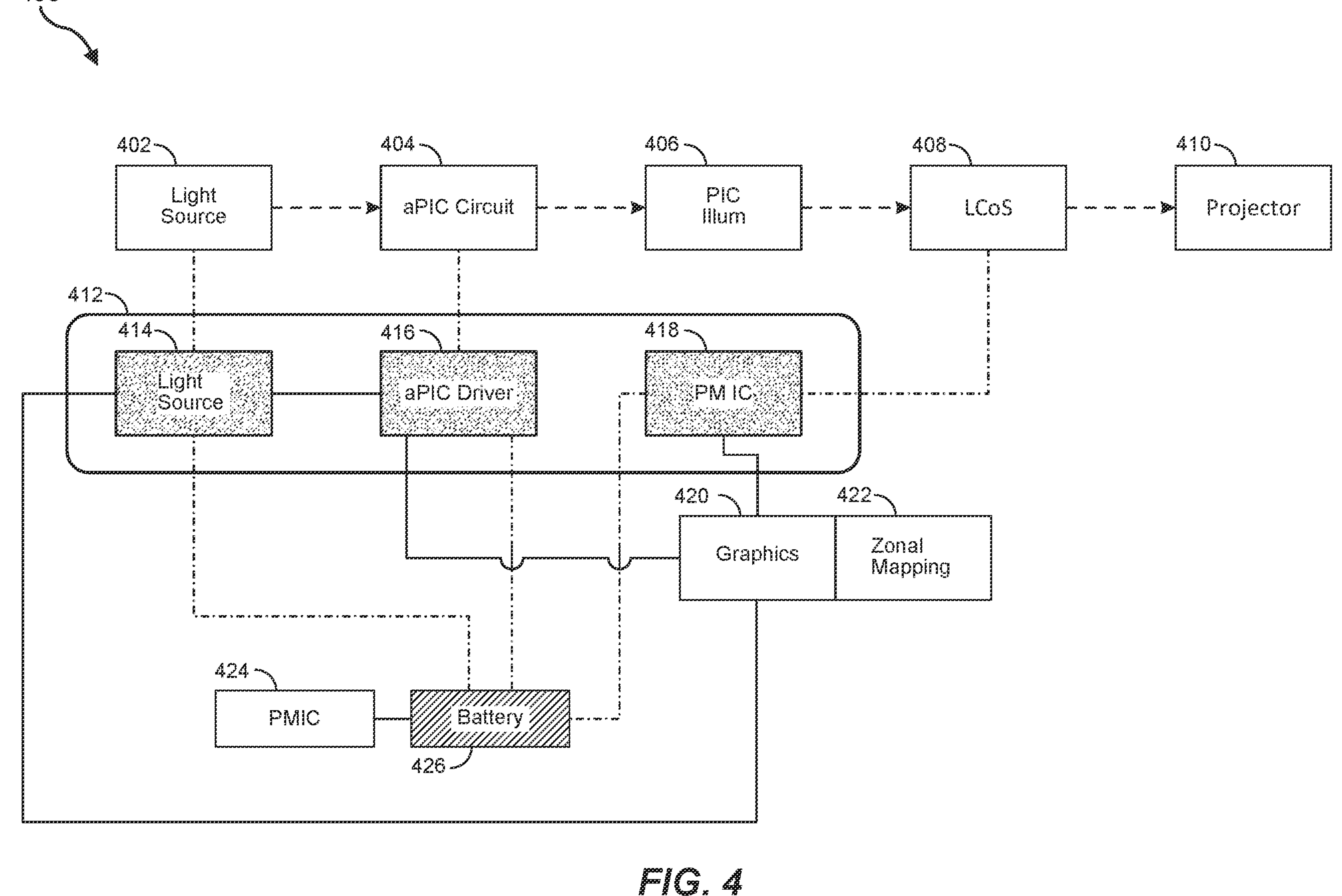
FIG. 4 shows a backlight according to some examples.

FIG. 4 shows a schematic of a further example backlight. The backlight 400 includes a light source 402, an active photonic circuit 404, a passive photonic circuit 406 (e.g., including out-couplers configured to illuminate the display), a liquid crystal display 408 (e.g., an LCoS display), and projection optics 410 (e.g., configured to direct light to one or more eyes of a user).

The backlight further includes a controller 412. In some examples, the controller includes a light source driver 414, an active photonic circuit driver 416, and a display driver power management IC (PMIC) 418. Power is supplied by a battery 426 (e.g., a lithium-ion battery), and battery power parameters (e.g., terminal voltage) may be monitored by a battery power management IC (PMIC) 424. The light source driver 414 may control the illumination intensity, pulsed operation parameters (e.g., duty cycle), or other operational parameters of the light source. The active photonic circuit driver 416 receives power from the battery and is configured to control active electrooptical elements (e.g., optical switches) in the active photonic circuit 404. The display driver PMIC receives power from the battery and may be configured to control the image display on the display 408. The graphics and zonal mapping circuit receives displayed image data from the display driver PMIC and determines image parameters for zones of the displayed image. The graphics and zonal mapping circuit may include a graphics component 420 and a zonal mapping component 422.

For example, for each zone, the zonal mapping circuit may determine a brightness parameter for the zone. A brightness parameter may include a peak brightness, mean brightness, or median brightness of the pixels within the respective zone. The brightness parameter may be adjusted for the eye brightness sensitivity curve, for example, with the intensity from a green pixel being given a higher weighting than the brightness of a blue and/or red pixel. The brightness of the backlight for each zone may be based on the brightness parameter for the displayed image of the respective zone. For example, if a particular zone displays a black image, the backlight brightness for that zone may be lower or may be zero. If a particular zone displays a bright image or bright image components, the backlight brightness for that zone may be higher, for example, based on the brightness parameter for that zone of the displayed image.

An active photonic circuit may include one or more active optical elements, such as an optical switch, optical modulator (e.g., an electrooptical modulator), beam steering device, beam shaping device, and the like. For example, various types of optical modulator can be used to adjust the intensity, modulate, or route the light through one or more waveguides. Example optical modulators include Mach-Zehnder Interferometers (MZI), ring resonators, add-drop filters, or other optical modulators. In some examples, an optical modulator may be used to change the path of the optical transmission through the optical modulator, and may be used to adjust the relative light intensities within a plurality of waveguides. In some examples, an electric signal may be used to control the light modulation.

Optical modulation may be based on an electrooptical effect, for example, where the refractive index of a material can be adjusted using an electric signal. In some examples, optical modulation may be achieved using thermal modulation, where the optical refractive index is adjusted by changing the temperature of the device (e.g., heating the device then letting the device cool). Other types of modulation can be use where appropriate for the application, such as acoustic-optical modulation, magneto-optical modulation, mechanical (e.g., stress-induced) modulation, and the like.

Figure 5A:
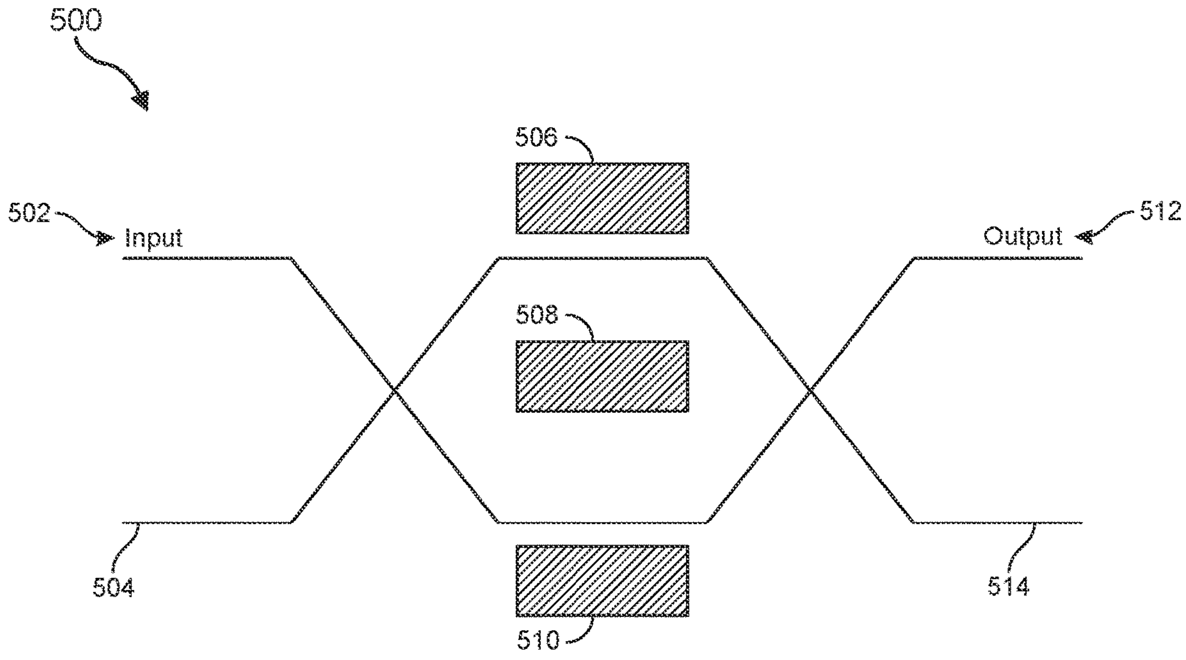
FIGS. 5A and 5B show a modulator according to some examples.

FIG. 5A shows a schematic of an example modulator 500, in this example an MZI optical modulator. The modulator 500 has a first input 502 and a second input 504, for example, provided by first and second input waveguides, and produces an output 512 and/or an output 514. The central active portion of the modulator may include three electrodes 506, 508, and 510, and waveguide sections passing between contact pairs may include an electrooptical material. Example electrooptical materials include ferroelectric materials or other electrooptical materials, such as lithium niobate or lithium tantalate. In some examples, three electrodes (e.g., two ground electrodes separated by a signal electrode) may be used to shift the phase of the optical mode transmitted through two channels, for example, by add a phase delay in a first channel and/or reducing a phase delay in a second channel. An electrically adjustable phase difference may be introduced between the two channels and used to modulate the light output.

Figure 5B:
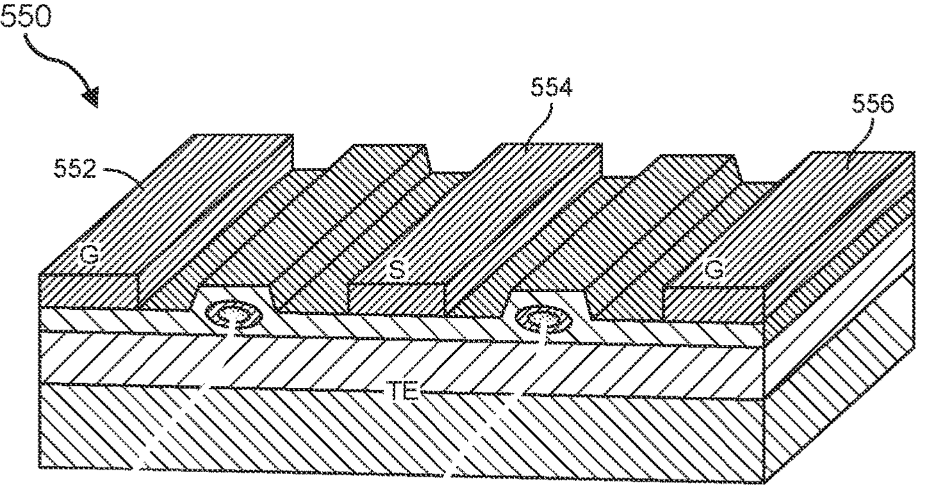

FIG. 5B shows a perspective view of an example modulator 550 including an MZI optical modulator that may be similar to that shown in FIG. 5A. The modulator 550 includes a first ground electrode 552, signal electrode 554 and second ground electrode 556.

Figure 6:
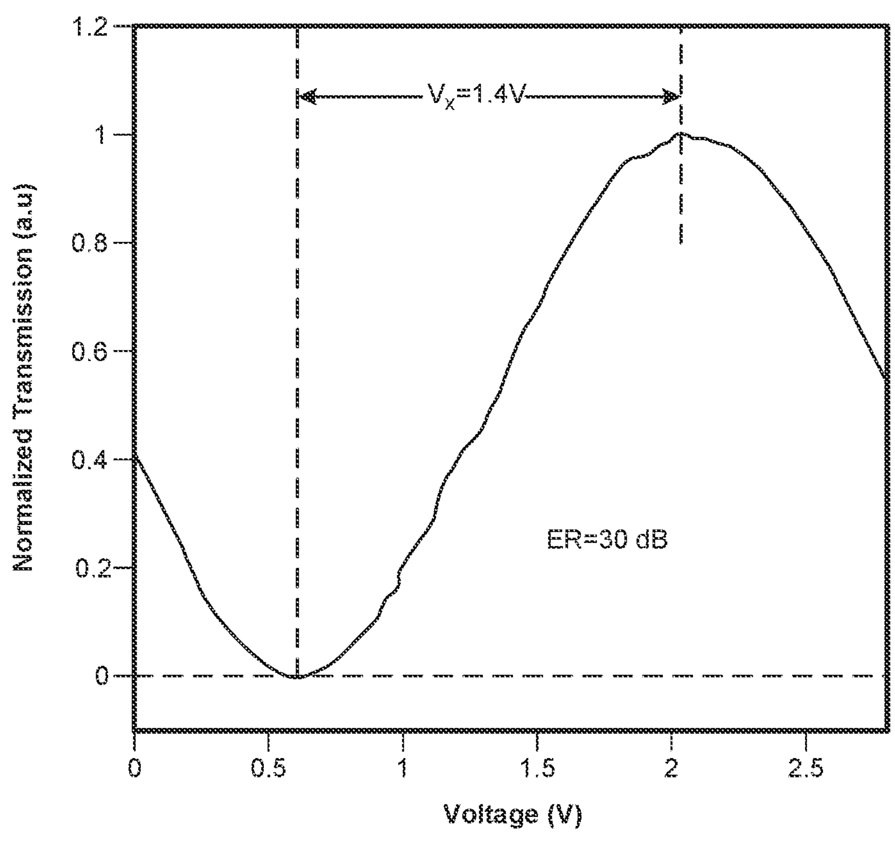
FIG. 6 shows optical transmission as a function of applied voltage for a modulator, according to some examples.

FIG. 6 shows optical transmission as a function of applied voltage for a modulator, such as the modulator discussed above in relation to FIG. 5A. An example of the transmission for one of the output ports is shown as a function of the applied voltage. By modulating the voltage, light output/transmission from one port can be changed from 0 to 100%, allowing light to be routed to a specific channel.

Figure 7:
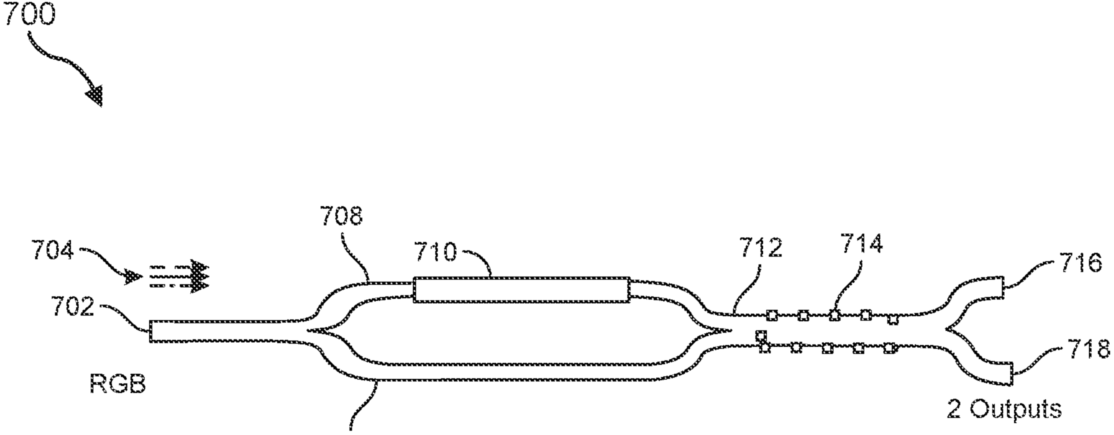
FIG. 7 shows a broadband modulator including an adjustable phase element, according to some examples.

FIG. 7 shows a modulator 700 including an input 702 configured to receive light 704 including red, green, or blue (RGB) wavelengths, a first splitter portion 706, a second splitter portion 708 including an adjustable phase element 710, output portion 712 including an optical interaction region 714, first output 716 and second output 718. The modulator 700 may include a 2×2 splitter configuration and may be configured to support RGB wavelength operation, which may be termed broadband operation. Relative output intensities between the first output 716 and the second output 718 may be adjusted as a function of adiabaticity, phase control, and/or wavelength. An example 2×2 splitter can be designed for a relatively compact footprint.

In some examples, red, green and blue light may be received sequentially and appropriate phase shifts ($\phi$) may be applied by the phase shift element 710 to direct light to one of the first output 716 and second output 718, for example, to obtain digital raster-scanning operation. Additional stages may be included, for example, to increase the number of outputs to 4, 8, 16, other power of 2, or other number of outputs.

In some examples, the phase shift can be applied to direct light including one or more wavelengths to obtain a particular ratio between the first output 716 and the second output 718, for example, for an analog parallel operation.

Figure 8:
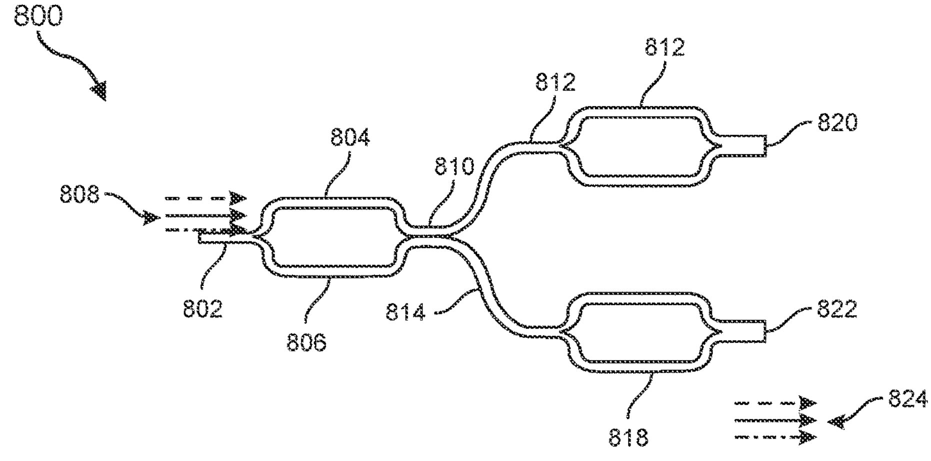
FIG. 8 shows a 1D achromatic MZI zonal illuminator, according to some examples.

FIG. 8 shows a zonal illuminator 800, in this example, a 1D achromatic MZI zonal illuminator. The zonal illuminator 800 may include an arrangement of modulators, for example, an arrangement of modulators having a configuration similar to that discussed above in relation to FIG. 7. Zonal illuminator 800 includes a first modulator including input 802 (configured to receive RGB light 808), first splitter arm 804, second splitter arm 806, optical interaction region 810, first output 812 (that provides an input to second modulator), and a second output 814 (that provides an input to the second modulator). The second modulator, having a similar configuration to the first modulator, provides outputs 820 and 822. The third modulator provides output 824. The first modulator may be considered a first modulator stage, and the second and third modulators and may be considered a second modulator stage. In some examples, an additional modulator stage may include four modulators each receiving one of outputs 820, 822, or 824 as a respective input, and providing two outputs for each input. Additional modulators may be included in an analogous manner. In some examples, an arrangement may include N modulator stages and provide $2^N$ outputs. Input light 808 and output 824 may include RGB light.

Figure 9:
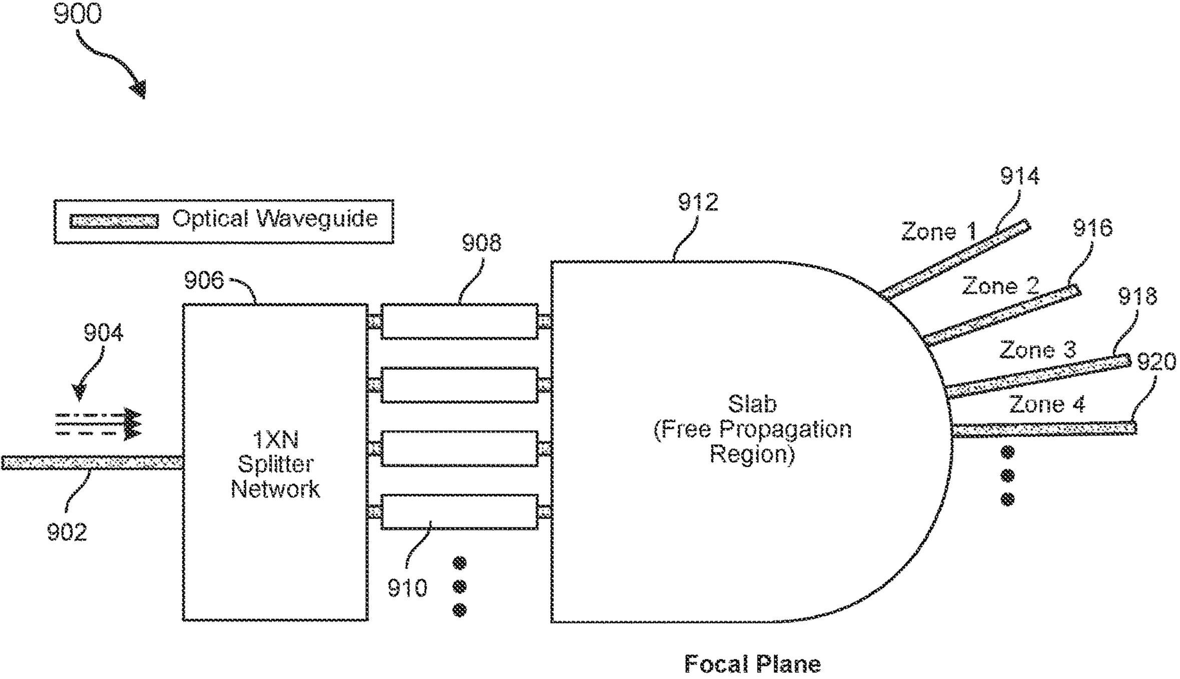
FIG. 9 shows a broadband (RGB) in-plane focusing phased array-based holographic zonal illuminator, according to some examples.

FIG. 9 shows a zonal illuminator 900, in this example a broadband (RGB) in-plane focusing phased array-based holographic zonal illuminator. Zonal illuminator 900 includes an input 902 that may be configured to receive RGB light 904, 1×N splitter network 906 having one input and N outputs, waveguide arrangement 908, optical phase array (OPA) 912 (including an OPA and a free space propagation slab), and zonal illumination outputs configured to provide light to respective zonal illumination waveguides (such as waveguides 914, 916, 918 and 920). Each waveguide of the waveguide arrangement 908 may be in optical communication with a respective output of the splitter network 906.

Each waveguide of the waveguides arrangement may include an adjustable phase element. The optical phase adjustments within the waveguide arrangement provides an in-plane focusing optical phased array within OPA 912 configured to direct light into respective outputs of the OPA 912, and hence to provide light for zonal illumination.

By applying phase shifts ($\phi 1$, $\phi 2$, $\phi 3$, . . . $\phi N$) within each waveguide of the waveguide arrangement 908, a single zone at a time may be illuminated by directing a light beam within OPA 912 to the output corresponding to a respective zonal illumination waveguide. In some examples, multiple zones may be illuminated simultaneously using an OPA 912 including a holographically focus element.

Figure 10:
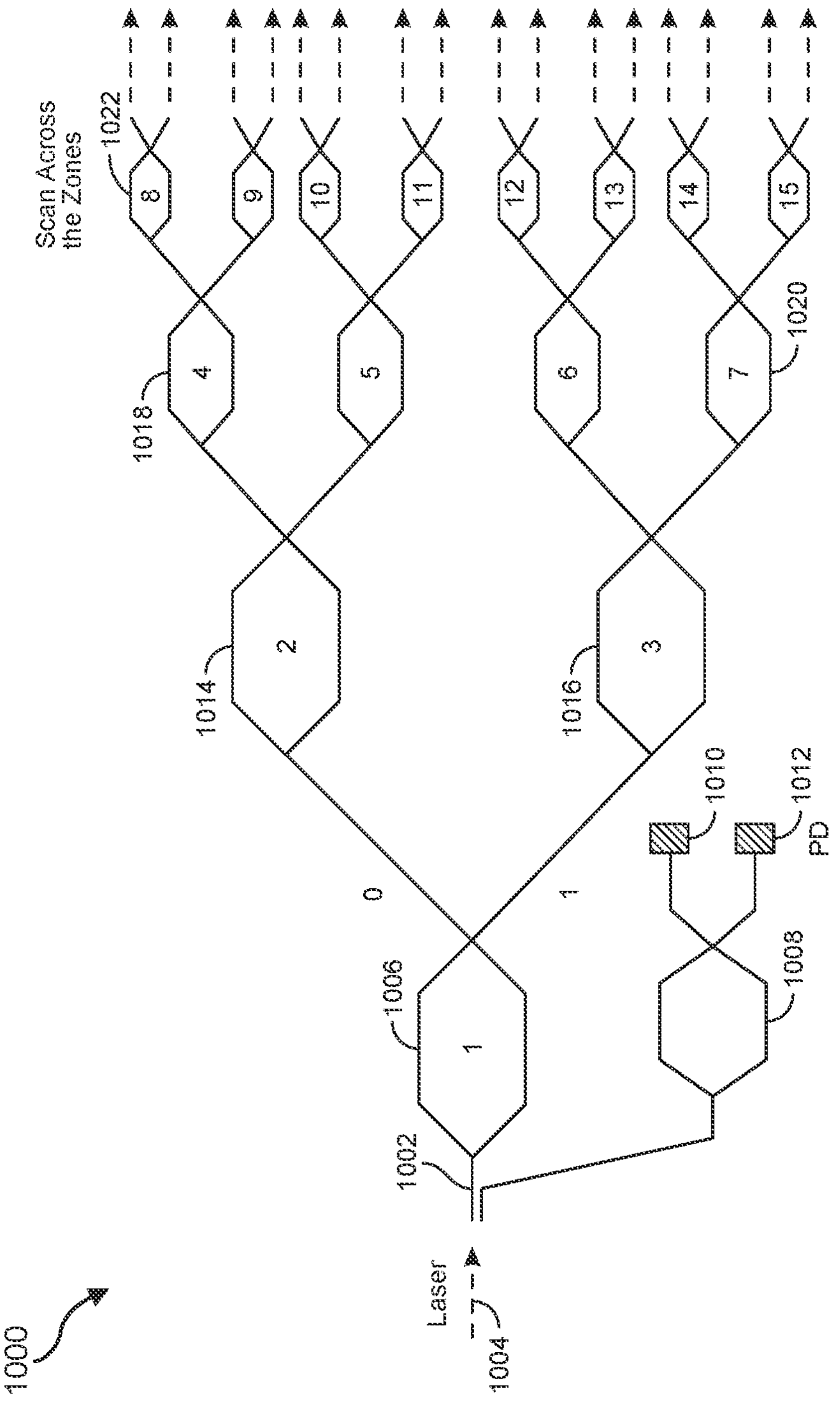
FIG. 10 shows a scanned zonal illuminator, according to some examples.

FIG. 10 shows a schematic of an example zonal illuminator. In this example, the zonal illuminator 1000 includes four modulator stages (discussed above in relation to FIG. 8) and has 16 outputs ($2^N$ outputs where N=4). Zonal illuminator 1000 includes an input configured to receive input light from a light source, in this example, input laser radiation 1004 from a laser (not shown). The input light is received by a first modulator 1006, which may be a 1×2 (number of inputs×number of outputs) having a configuration that may be similar to that discussed above in relation to FIGS. 5A-8. The first modulator may be referred to as a first modulator stage. A first output of the first modulator 1006 may provide the input to modulator 1014. A second output of the first modulator 1006 may provide the input to modulator 1016. Modulators 1014 and 1016 may be referred to as a second modulator stage. Similarly, the second modulator stage may provide 4 outputs to a third modulator stage (including four modulators including 1018 and 1020), which may provide 8 inputs to a fourth modulator stage (including eight modulators such as modulators 1022). The fourth modulator stage provides 16 outputs, indicated by dashed lines. Zonal illuminator 1000 may include an additional modulator 1008 having one or more outputs to the respective one or more photodiodes. The modulator output may be used for optical power and modulator monitoring.

An example zonal illuminator may include N modulator stages (in this example, N=4), provide $2^N$ outputs (in this example, 16 outputs), and includes ($2^N$-1) modulators (in this example, 15 modulators numbered 1-15 in the figure). However, N is not limited to four, and may be any suitable number. In some examples, N may be in the range 2-64, thought this range is exemplary and not limiting.

In some examples, each modulator may be independently controlled, for example, using an electric signal. The state of each modulator may be updated to direct light to a particular zone, for example, using a raster scan approach. For example, modulator 1006 (labeled modulator number 1) may be electrically controlled so that the first output is “off” with no light transmitted (labeled “0”) and the second output is “on” with light transmission (e.g., to modulator 1016). A similar approach may be used for the remaining modulators. Using suitable electrical signals applied to one or more modulators, light may be directed to one or more desired backlight zones.

In some examples, zonal illumination may use an analog approach. Each modulator may be independently controlled, and the state of the modulator may be updated to direct light to different zones with an adjustable intensity, for example, based on displayed content. In some examples, each zone may be illuminated simultaneously with a desired relative intensity based on the displayed content.

In some examples, the laser and/or modulators may show changes in operational parameters over time. For example, operational voltage may drift over time due to temperature or charge accumulation, and the like. Light intensity (e.g., the intensity of the input laser radiation and/or one or more modulator output light levels) may be monitored by one or more photodetectors, such as photodetector (PD) 1010 and/or photodetector 1012. Example photodetectors may include photodiodes, photoresistors, and the like.

In a first example approach, the illumination intensity for each zone may be calculated based on the displayed content, for example, based on the maximum brightness of a pixel within the zone. For example, if the brightness of a pixel in a first zone is half of the maximum brightness, the illumination intensity may be adjusted accordingly. This approach may provide appreciable power savings as the illumination intensity may be reduced for display zones having relatively dark content.

In a second example approach, the illumination per zone may be limited to particular levels, such as binary levels in which the illumination is either on or off based on the displayed content. In some examples, the illumination intensity may be set to a maximum brightness and, for example, the time of illumination may be adjusted based on the displayed content. In some examples, when a backlight zone is illuminated, the illumination intensity may be adjusted to a particular level, for example, based on the displayed content. This approach may provide simplified data processing, for example, in relation to the first example approach discussed above.

An active photonic circuit may include one or more optical modulators. Optical modulators may be used to control light paths through the active photonic circuit, for example by routing the light to different zones under electrical control. In some examples, a modulator may operates as a binary switch where the light output is two one of the channels, so that the light output may have only has 0 and 1 states (e.g., as discussed above in relation to FIG. 10. In some examples, modulators may be operated in an analog mode, where the output level may be adjusted (e.g., under electrical control) from zero (denoted 0) to maximum intensity (denoted 1) continuously or stepwise. In some examples, an output intensity may be adjusted within a relatively linear operation regime of the modulator. For example, a Mach-Zehnder Interferometer based modulators may be adjusted between first and second fractions of the maximum output intensity, for example, in a range between 0.2 and 0.8 of the maximum intensity. Power consumption may be slightly higher compared with a full range operation (0 to 1) of a modulator, but operation may be more robust (e.g., more predictable and/or more reproducible).

In some examples, laser output intensity may be modulated. In some examples, power consumption may be reduced using zonal illumination using modulated laser output intensity based on the illuminated zone. For example, the laser output intensity may be modulated using amplitude modulation (e.g., by modulating the laser current) and/or power modulation using pulse width modulation (PWM). For example, the duty ratio used for illumination of a zone may be based on the displayed content within the zone. The duty ratio may be less than 5% for relatively dark displayed content and 10% or greater for relatively bright displayed content.

The light source may be coupled to a photonic circuit using one or more of various approaches. For example, for laser illumination, a laser (e.g., a laser diode) may be edge coupled to the active photonic circuit and/or the laser may be mounted on a submount or flip-chip bonded to the active photonic circuit die. If red, green, and blue light sources are used, the light source outputs may be combined before coupling into the photonic circuit, or combined within the photonic circuit. In some examples, the light source may be coupled to the photonic circuit using one or more optical components, such as a lens (e.g., a microoptics component), prism, grating coupler, metamaterial, and/or one or more other optical components.

In some examples, and active PIC and passive PIC may be integrated, for example, within the same die. For example, a first part of the die may be configured as active photonic circuit and a second part of the die may be configured as a passive photonic circuit.

In some examples, the active photonic circuit and the passive photonic circuit may be fabricated using separate dies, optionally with different materials platforms. In some examples, an active photonic circuit can be based on an electrooptical material such as lithium niobate ($LiNbO_3$). In some example, the passive photonic circuit can be based on a dielectric material such as an oxide, silicide, or nitride material (e.g., silicon nitride, SiN). In some examples, the active photonic circuit and passive photonic circuit may be integrated on the same die, and may be formed using different materials. For example, different materials may be provided by different layers within a substrate.

Figure 11:
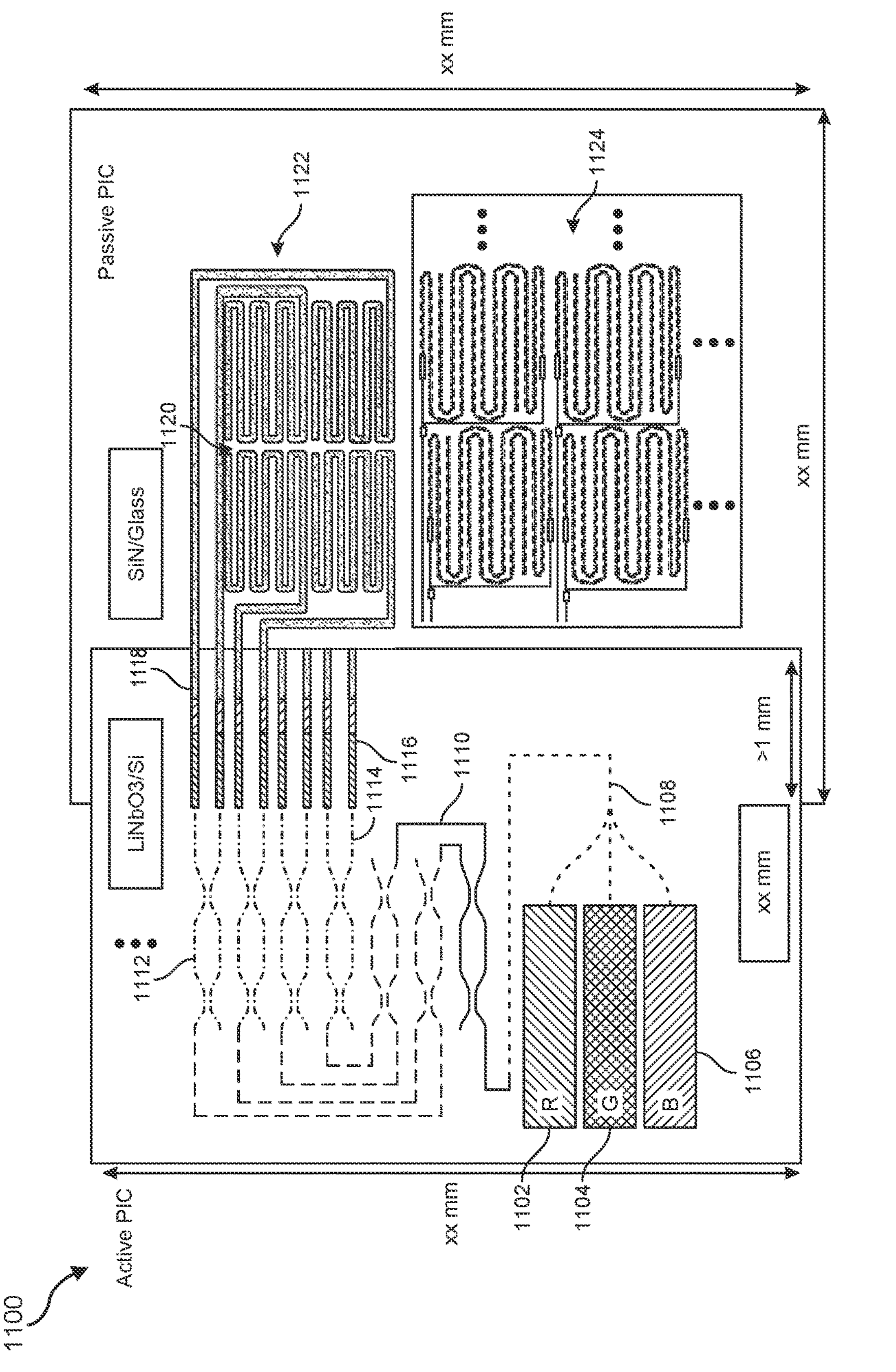
FIG. 11 shows an active photonic circuit integrated with a passive photonic circuit within a zonal illuminator, according to some examples.

FIG. 11 shows an example zonal illuminator including an active photonic circuit integrated with a passive photonic circuit. Zonal illuminator 1100 includes red laser 1102, green laser 1104 and blue laser 1106. Laser outputs may be combined within laser coupling waveguide 1108 and the combined laser beam (e.g., including RGB light) is input into an active photonic circuit. The active photonic circuit may include an arrangement of modulators, such as 1×2 or 2×2 Mach-Zehnder interferometer based modulators. In some examples, modulators may use a single input. The illustrated configuration shows three modulator stages providing 8 outputs, but this is not limiting and any suitable number of modulator stages may be used. The active photonic circuit may be formed on an active substrate, for example, including an electrooptical material such lithium niobate. In some examples, the active photonic circuit may be formed on a lithium niobate/silicon active substrate.

Waveguide connections (e.g., waveguides 1116 and 1118) couple light output by the active photonic circuit into a passive photonic circuit. The passive photonic circuit may be formed on a passive substrate (e.g., having no appreciable electrooptical effects during normal operation of the device). In some examples, the passive substrate may include a silicon nitride/glass passive substrate. The passive substrate may include an arrangement of waveguides used to illuminate various zones of the backlight. For example, waveguide 1118 of the active photonic circuit may be coupled to waveguide 1122 of the passive photonic circuit, and waveguide 1122 may illuminate a zone of the backlight through an outcoupling portion 1124 of the waveguide 1122. The outcoupling portion may include out-couplers configured to direct light from the outcoupling portion 1124 of waveguide 1122 towards, for example, a liquid crystal display (not shown). The illumination intensity of the illuminated zone may be based on the displayed content on the liquid crystal display.

In some examples, zonal illumination may be used within an LCOS display assembly including a backlight. Red, green, and blue laser sources may be used. The modulators may be $LiNbO_3$ based MZI optical modulators. The applied electrical signal may be based on an MZI having a VpiL (an electrooptical figure of merit known in the electrooptical arts) of 7 V·cm. Raster scanning based zonal illumination may be used with a display within an augmented reality (AR) device with a 70 degree diagonal field of view (FOV). Displayed contents may have a fill factor of approximately 30% (e.g., 30% of pixels are bright), with a grayscale of approximately 30% for pixels that are on (e.g., bright). Laser diodes may be used as the light source for R, G, B color. The lasers may have an approximately 50% coupling efficiency to the active photonic circuit. The active photonic circuit may have an approximately and 90% coupling efficiency to the passive photonic circuit. The passive photonic circuit may provide an approximately 50% illumination efficiency of the LCOS display. The LCOS display may have a 120 Hz frame rate. The power consumption of the example display was determined for various modes of operation.

Figure 12:
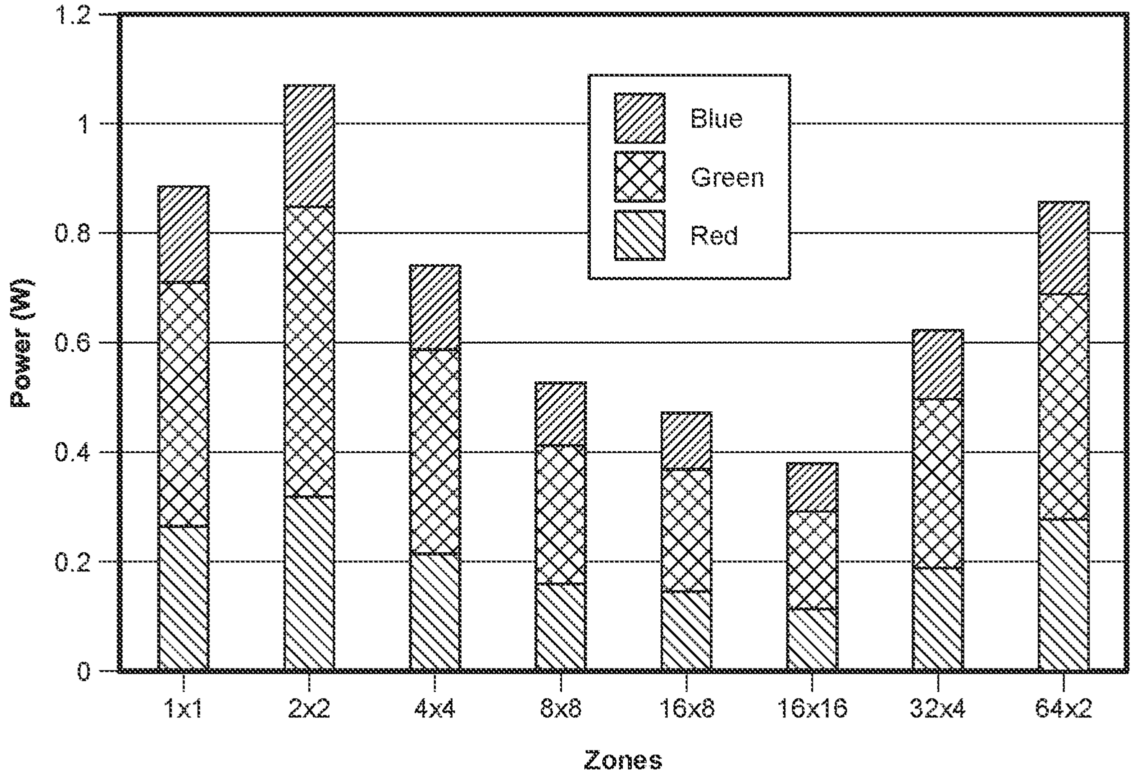
FIG. 12 shows the power consumption of a backlight assembly as a function of the number and arrangement of display zones, according to some examples.

FIG. 12 shows the power consumption of a backlight assembly as a function of the number and arrangement of display zones The figure shows the power consumption of an example backlight assembly as a stacked bar chart for red, green, and blue illumination, including the power consumption of the light sources (e.g., RGB lasers), control circuit (e.g., including a driver circuit), and an active photonic circuit (e.g., including modulators). The total height of each bar is the total power for RGB operation under typical operating conditions. The power consumption is shown as a function of the number of zones. There is an appreciable power saving for 4×4, 8×8, 16×8, and 16×16 zones. For these configurations, the power savings increase as the number of zones increases. In these examples, the power consumption increases going from 1 zone to 2×2 zones due to the optical loss penalty in the active photonic circuit. The 64×2 configuration also shows a slight power saving.

In some examples, a zonal scan based backlight may include an arrangement (e.g., an array) of ring resonators. The ring resonators may be configured for broadband operation (e.g., operational for RGB light). Ring resonators allow a more compact device design compared to MZI based modulators, particularly for a large number of zones (e.g., 8×8 or more zones). For example, an 1000 element zone ring/waveguide array may be fabricated on less than a 3.4 mm×2.5 mm substrate area. An arrangement of a similar number (1024) of MZI modulators may require a substrate area of approximately 20 mm×85 mm. An MZI based modulator may provide a high dynamic range and necessary amplitude control. For example, a dynamic range of 30 dB may be achieved with a single MZI stage, and a dynamic range of 60 dB may be achieved with two MZI stages. A ring resonator based zonal illuminator may only use two high-speed drivers, compared with 10 drivers for the previously described configuration.

As noted above, a zonal illuminator based on ring resonators may be more compact, particularly for a large number of zones, compared with a zonal illuminator including a similar number of MZI based modulators. Ring resonators may be configured to have resonances across the visible (e.g., RGB) spectrum, for example, with a particular free spectral range (FSR) frequency spacing between resonances.

Figure 13:
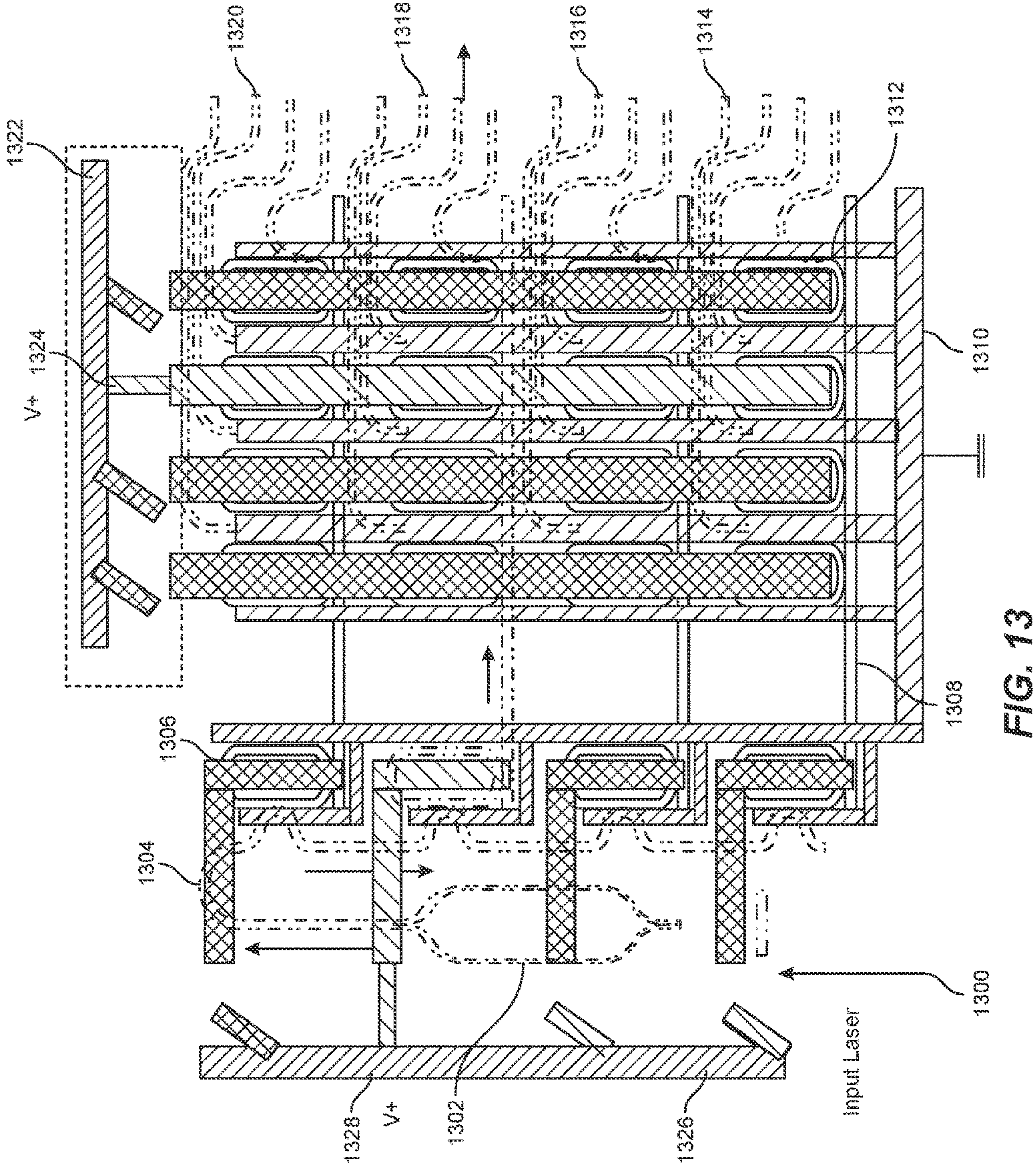
FIG. 13 shows an zonal illuminator including an array of ring resonators, according to some examples.

FIG. 13 shows an example zonal illuminator 1300 having a scan based operation mode and including an array of ring resonators. The ring resonators may be configured for broadband (RGB) operation. Zonal illuminator 1100 may include an MZI modulator 1302 for amplitude control, a radio-frequency (RF) switch 1304 including a portion 1306 extending over ring resonator 1307, waveguide 1308, ground connection 1310, ring resonator 1312 (e.g., formed using a closed loop waveguide portion), ring resonator waveguide connections 1314, 1316, 1318, and 1320 (e.g., including waveguides connected to the ring resonators, though the connections may be obscured in the figure by ground connections), and positive voltage connections (1322, 1324, 1326 and 1328). The oblique elements 1330 represent open switches. Closed switches are shown at 1324 and 1328. In the illustrated configuration, laser light (e.g., RGB laser light) may be coupled into an input of the MZI modulator 1302. MZI modulator may control the laser light intensity passing through the MZI modulator 1302 and may function as a light intensity control. Closed switch allows light to be coupled into a corresponding row waveguide (horizontal waveguide as illustrated). The closed switch 1324 modifies operation of the ring resonator to allow light (in the illuminated row waveguide) to couple through the ring resonator into a waveguide coupled to the ring resonator. The light emerges from the waveguide. Using various combinations of closed switches, selected ring resonators may be activated to allow optical coupling from the laser, through the MZI modulator 1302, through a horizontal waveguide corresponding to a closed switch, through a selected ring resonator, and into a waveguide optically coupled to the ring resonator. The light output can be scanned through the outputs through suitable combinations of closed switches in a multiplexed method of operation.

FIG. 14 shows a cross-sectional view of an electrooptic (EO) MZI modulator. Device 1400 includes first metal electrode 1402 (e.g., a signal electrode), second metal electrode 1404 (e.g., a ground electrode), electrooptical layer 1406 (e.g., a lithium niobate layer) a dielectric substrate 1410 (e.g., a silicon oxide substrate), indium tin oxide (ITO) signal electrode 1414, and ITO ground electrode 1416.

In some examples, an electrode may include a metal portion and transparent conductive material portion. Example transparent conductive materials include transparent conductive electrode materials such as indium tin oxide (ITO), tin oxide, or other suitable material.

FIGS. 15A and 15B show top view of a portion of an example MZI modulator device.

FIG. 15A shows an example device 1500 including a first electrode 1502, an electrooptical waveguide 1504 and a second electrode 1506. In some examples, the first electrode and second electrode may be metal electrodes, such as aluminum (Al) electrodes. The cutoff frequency may be determined to be 4 GHz.

FIG. 15B shows an example device 1500 including a first electrode 1520 including a first metal electrode 1522, a second metal electrode 1530, a first ITO electrode 1524, a second ITO electrode 1528 and an electrooptical waveguide 1526. The cutoff frequency may be determined to be 16 GHz.

The RC time constant (related to the cutoff frequency) improves due to the smaller capacitance due to the smaller electrode gap, in this example, between the ITO electrodes. The improvement is despite the higher resistivity of ITO. To compensate for the decrease in speed due to the high resistivity of ITO compared to other metals, ITO can be placed only near the waveguide, and a higher conductivity metal (Al, Au, Ag, Cu, Cr, etc.) can be integrated with the conductive metal oxide electrode.

Figure 16A:
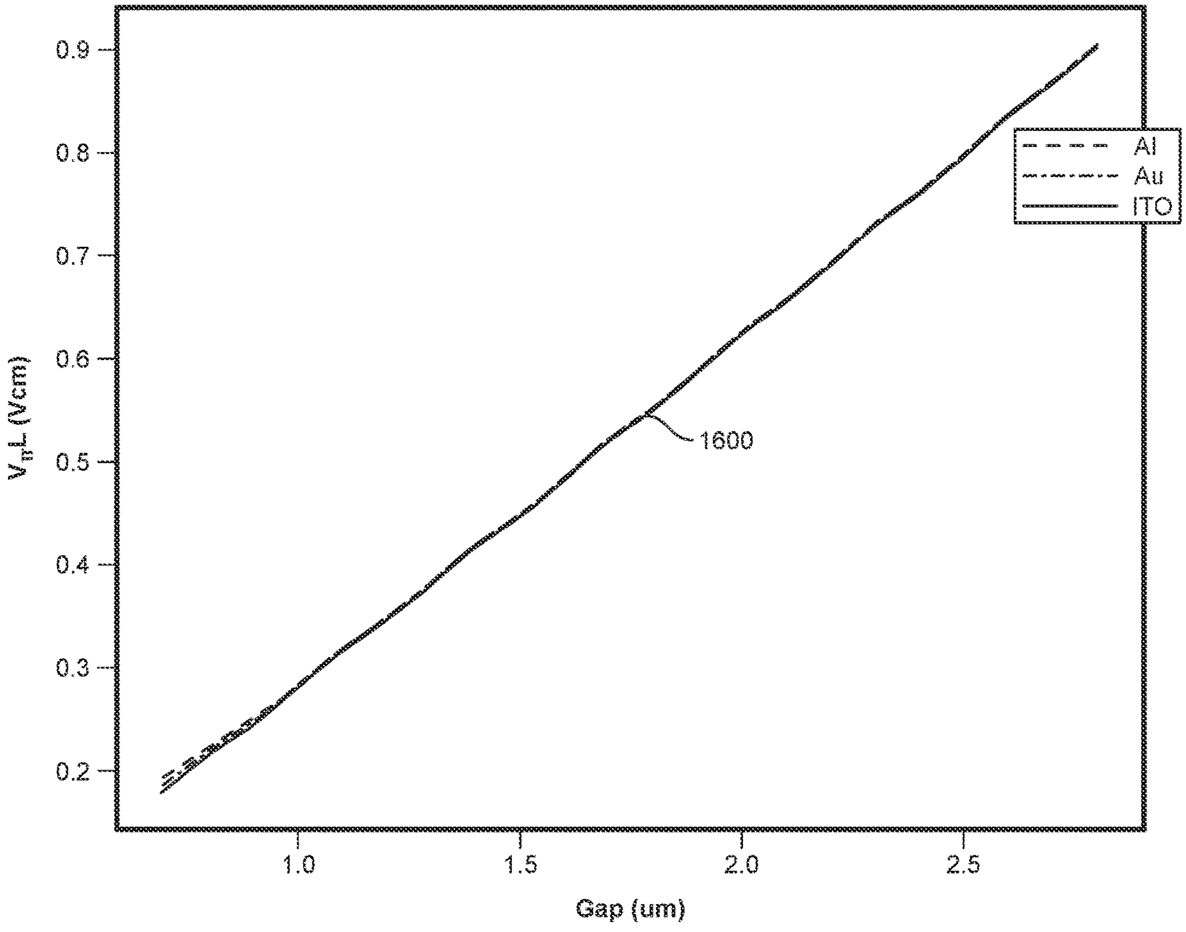
FIGS. 16A and 16B show the half-wave voltage length loss products for MZI modulator configurations, according to some examples.
Figure 16B:
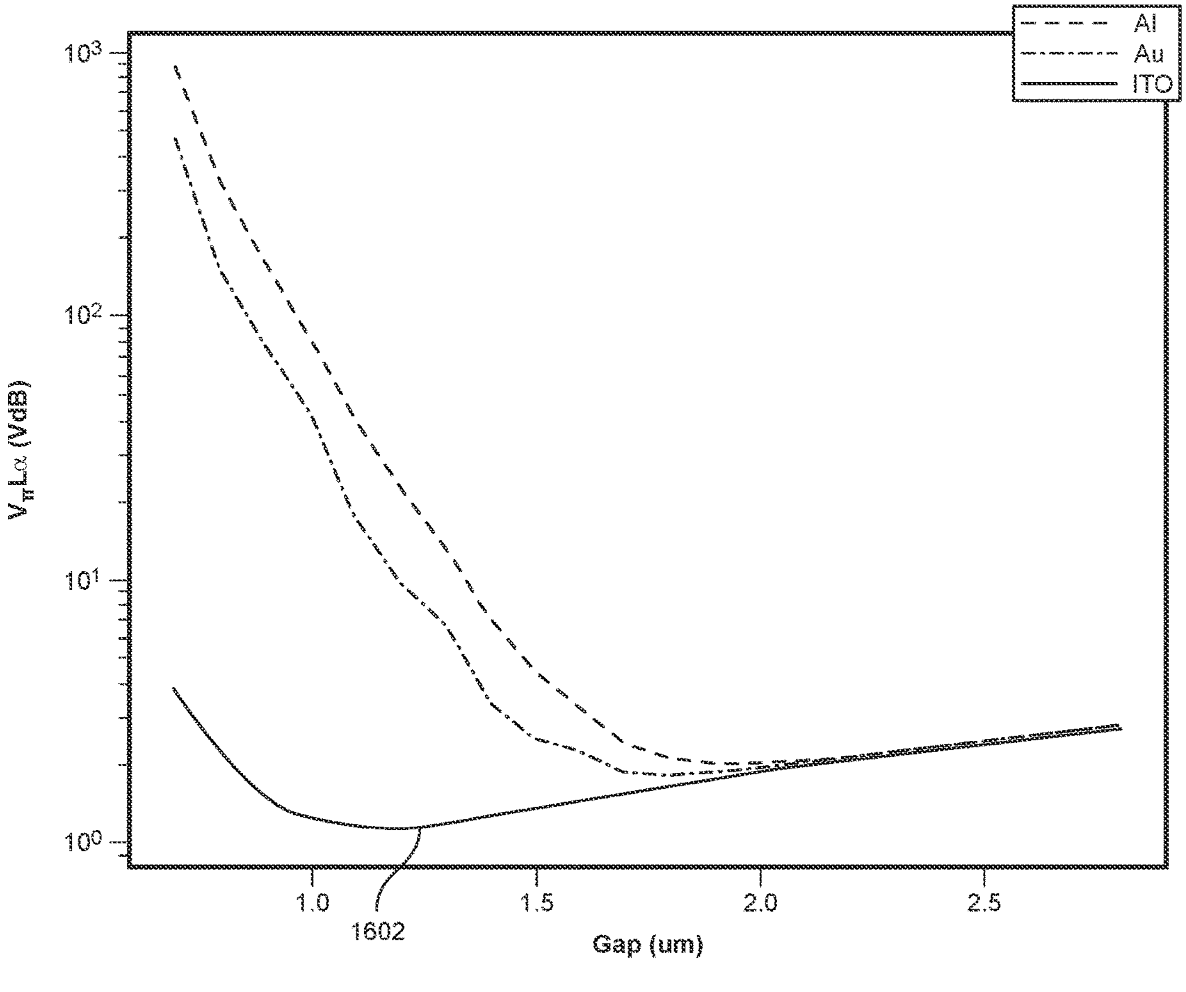

FIGS. 16A and 16B show the half-wave voltage length loss products for an example MZI modulator device, according to some examples. The device may have a structure similar to that shown in FIG. 15B and may be used as a power-efficient electrooptic (EO) MZI device.

FIG. 16A shows the voltage length product ($V_\pi L$) as a function of electrode gap (microns) and electrode composition (Al, Au, and ITO). The curves are similar.

FIG. 16B shows the half-wave voltage length loss product ($V_\pi L\alpha$, where $\alpha$ is optical loss) as a function of electrode gap (microns) and electrode composition (Al, Au, and ITO). ITO has lower $V_\pi L\alpha$ compared to other metals. A device including a conductive metal oxide electrode such as ITO enables a smaller electrode gap, thus reducing the power consumption of individual optical switches.

Using transparent electrodes is not limited to EO modulators. Transparent conductive oxide electrodes may be included in LC modulators or MEMs modulators to decrease capacitance and/or increase device speed.

Figure 17:
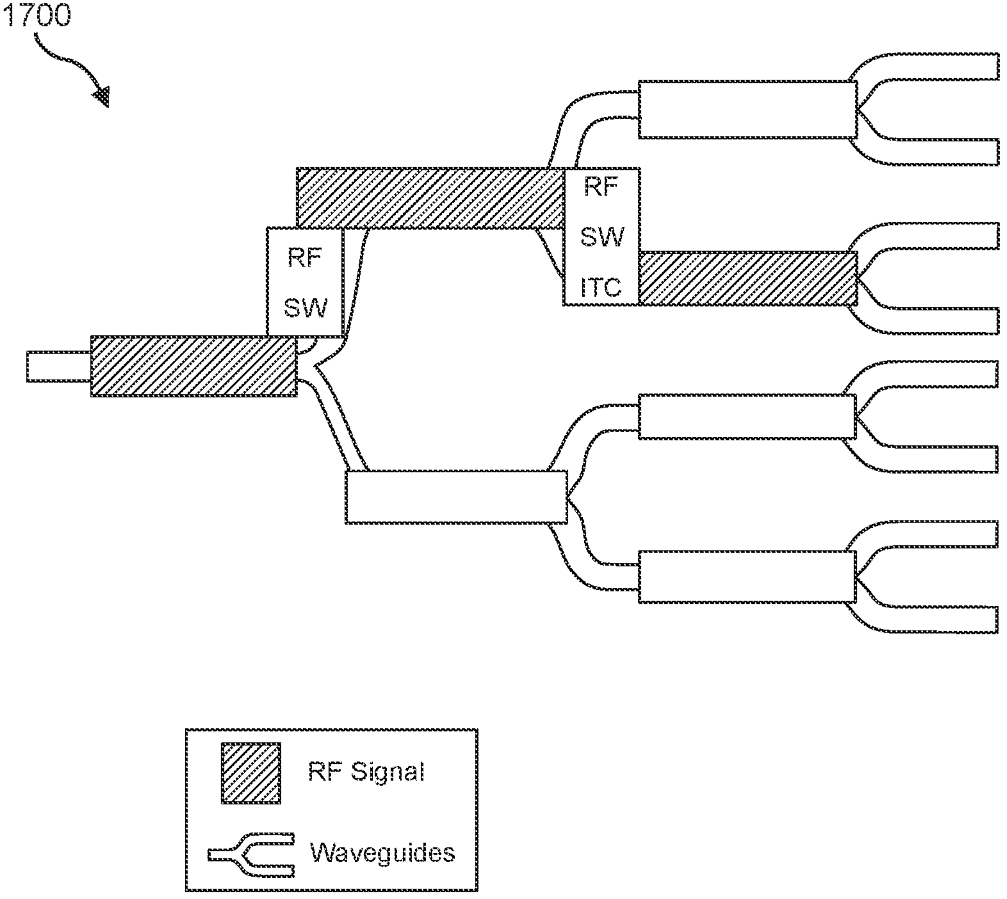
FIG. 17 shows a zonal illuminator configuration allowing compact fabrication and low-power operation, according to some examples.

FIG. 17 shows an example zonal illuminator 1700 with a configuration allowing compact fabrication and low-power operation. An electronic-photonic integration allows appreciably reduced electronic power consumption of an example EO MZI switch tree. In some examples, the RF signal can be routed along a similar path as the optical signal. The path of the RF signal may be selected by an RF switch that connects the striplines. In some examples, this allows the number of RF drivers to be reduced to a single RF driver.

A relatively long stripline with RF switches may be divided into multiple sections to minimize voltage attenuation. This approach may still allow the number of RF drivers to be reduced, compared to having an RF driver associated with each MZI.

Striplines can be impedance-matched to a higher impedance to minimize current/power consumption, as the EO effect solely depends on the strength of the applied electric field (voltage).

Figure 18:
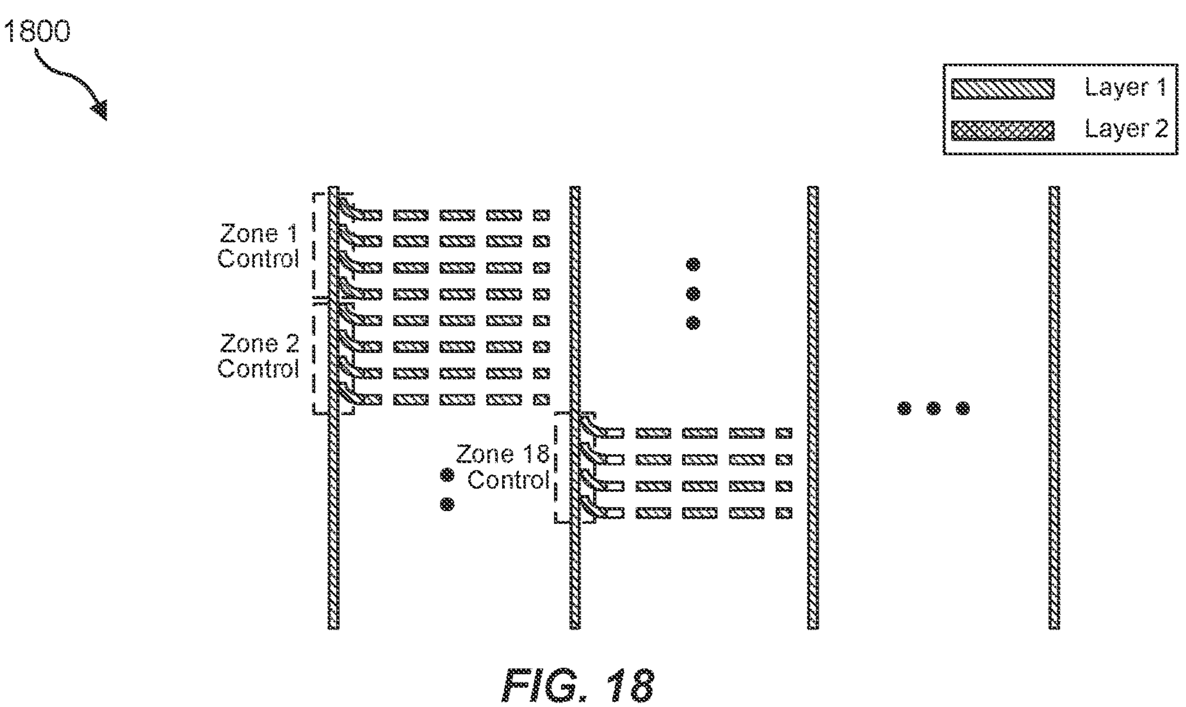
FIG. 18 shows a simplified schematic of a zonal illuminator including a switchable directional/evanescent coupler or unbalanced γ-splitter, according to some examples.

FIG. 18 shows a simplified schematic of an example zonal illuminator 1800 including a switchable directional/evanescent coupler or unbalanced γ-splitter. Outcoupling zones can be located on alternating layers to reduce or eliminate gaps between each zone (e.g., layer1, layer2, layer1, layer2, etc.). The photonic circuit may be based on the MZI configuration and the configuration shown in the figure. Each zone may be controlled using a MEMS device (e.g., a MEMS coupler), an LC switchable coupler, an add-drop filter, etc.

Figure 19:
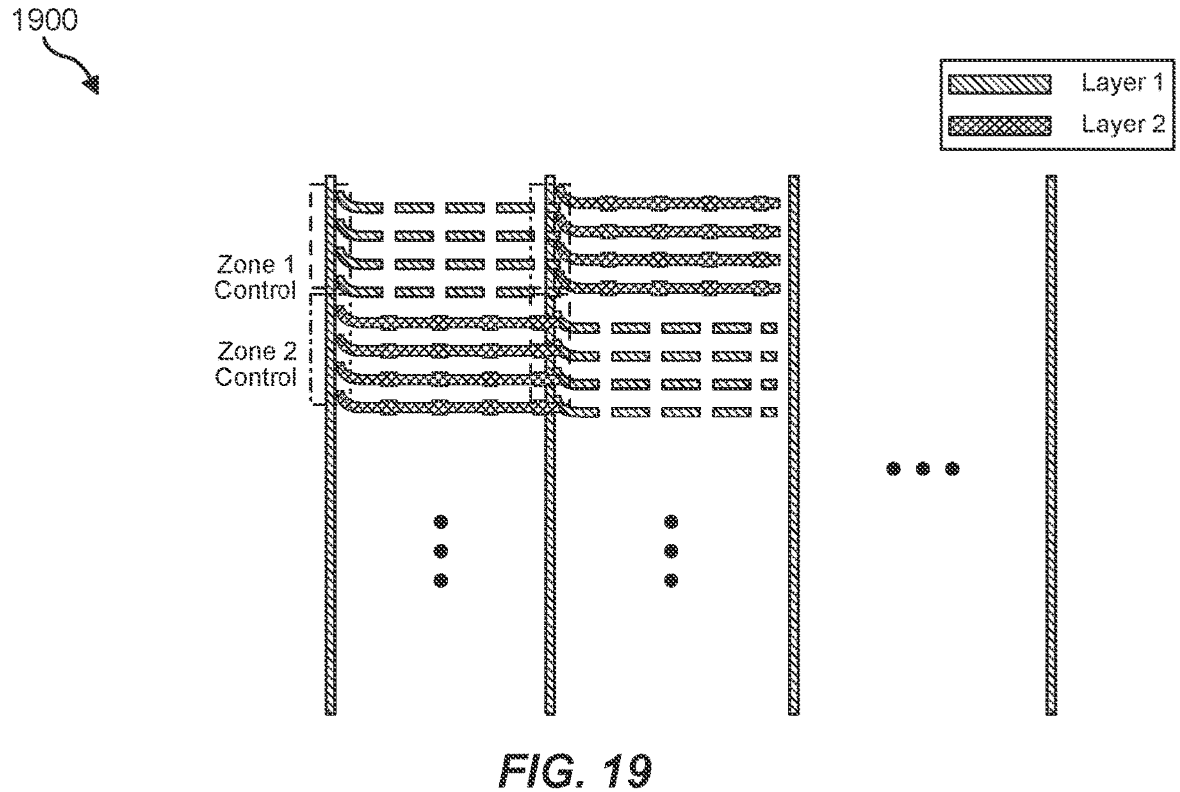
FIG. 19 shows a further simplified schematic of a zonal illuminator including outcoupling zones located on alternating layers to allow spatially continuous illumination, according to some examples.

FIG. 19 shows a further simplified schematic of a zonal illuminator 1900 including outcoupling zones located on alternating layers to allow spatially continuous illumination.

Figure 20:
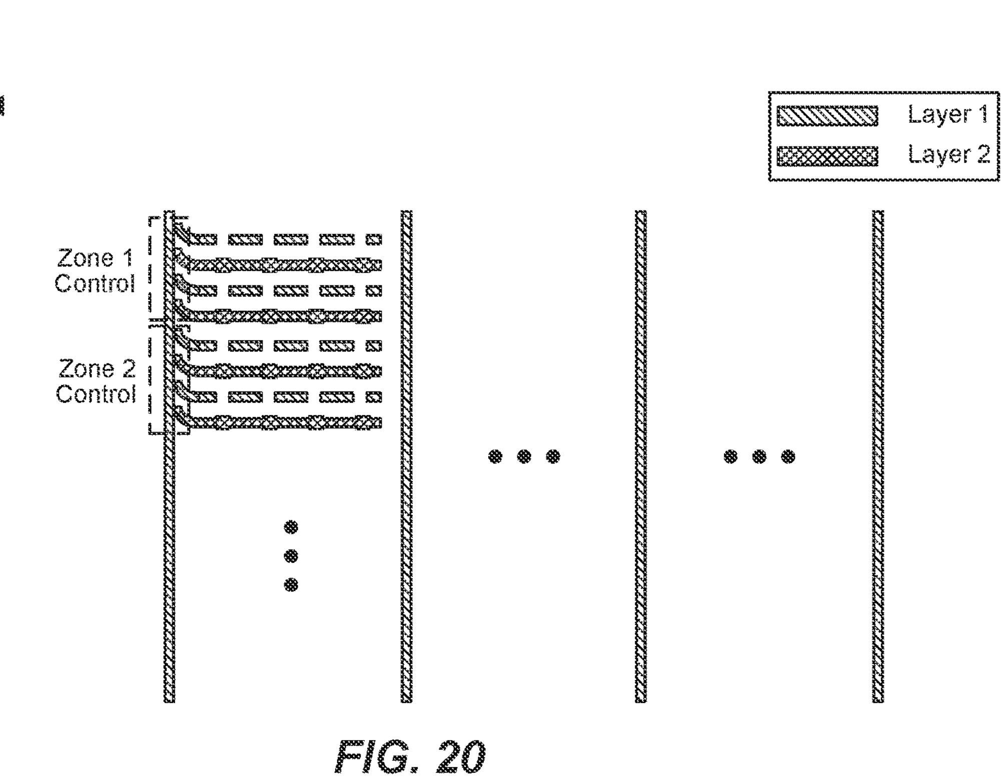
FIG. 20 shows a further simplified schematic of a zonal illuminator including outcoupling zones located on alternating layers to allow spatially continuous illumination, according to some examples.

FIG. 20 shows a further simplified schematic of a zonal illuminator 2000 including outcoupling zones located on alternating layers to allow spatially continuous illumination.

Figure 21:
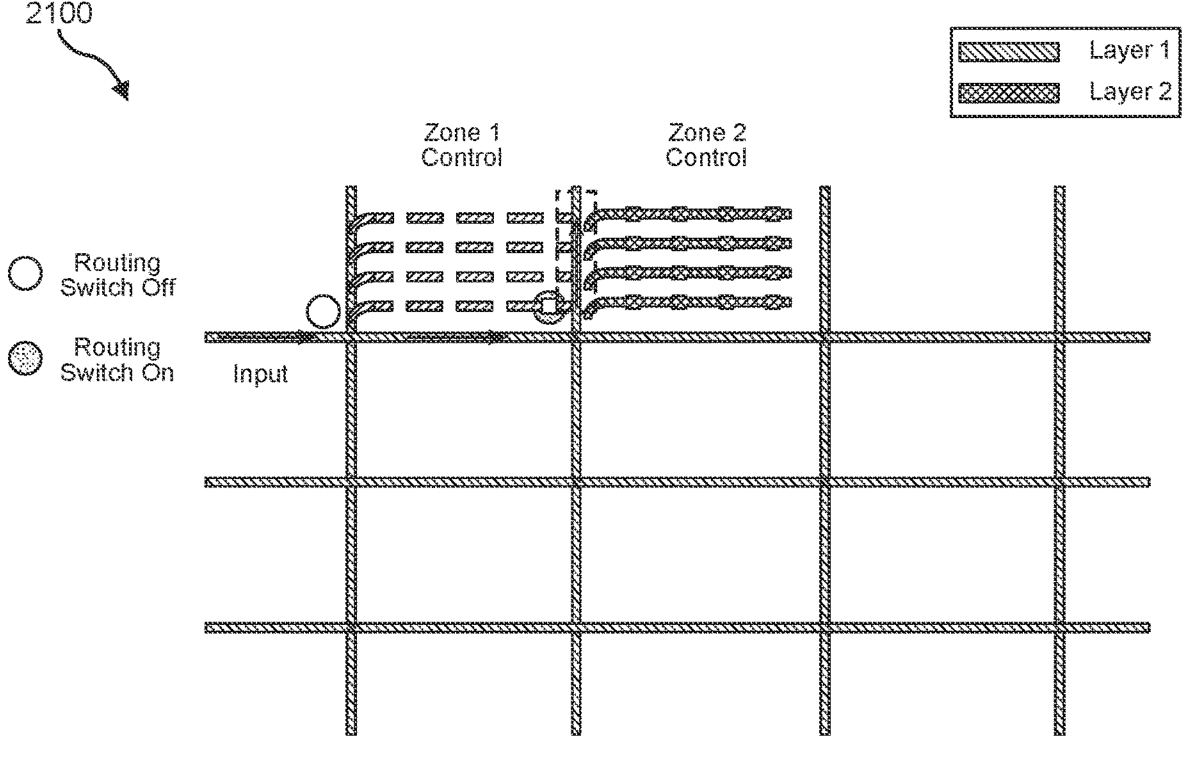
FIG. 21 shows a simplified schematic of a zonal illuminator having a network-on-chip architecture, according to some examples.

FIG. 21 shows a simplified schematic of an example zonal illuminator 2100 having a network-on-chip architecture. Zonal circuitry can be designed in network-on-chip architecture. Waveguide crossings enable light to pass through when the routing switch is off and directs light to another path when the routing switch is on. The routing switch may include a MEMs switch, an add-drop filter, an LC-based directional coupler, and/or any other suitable switch.

Figure 22:
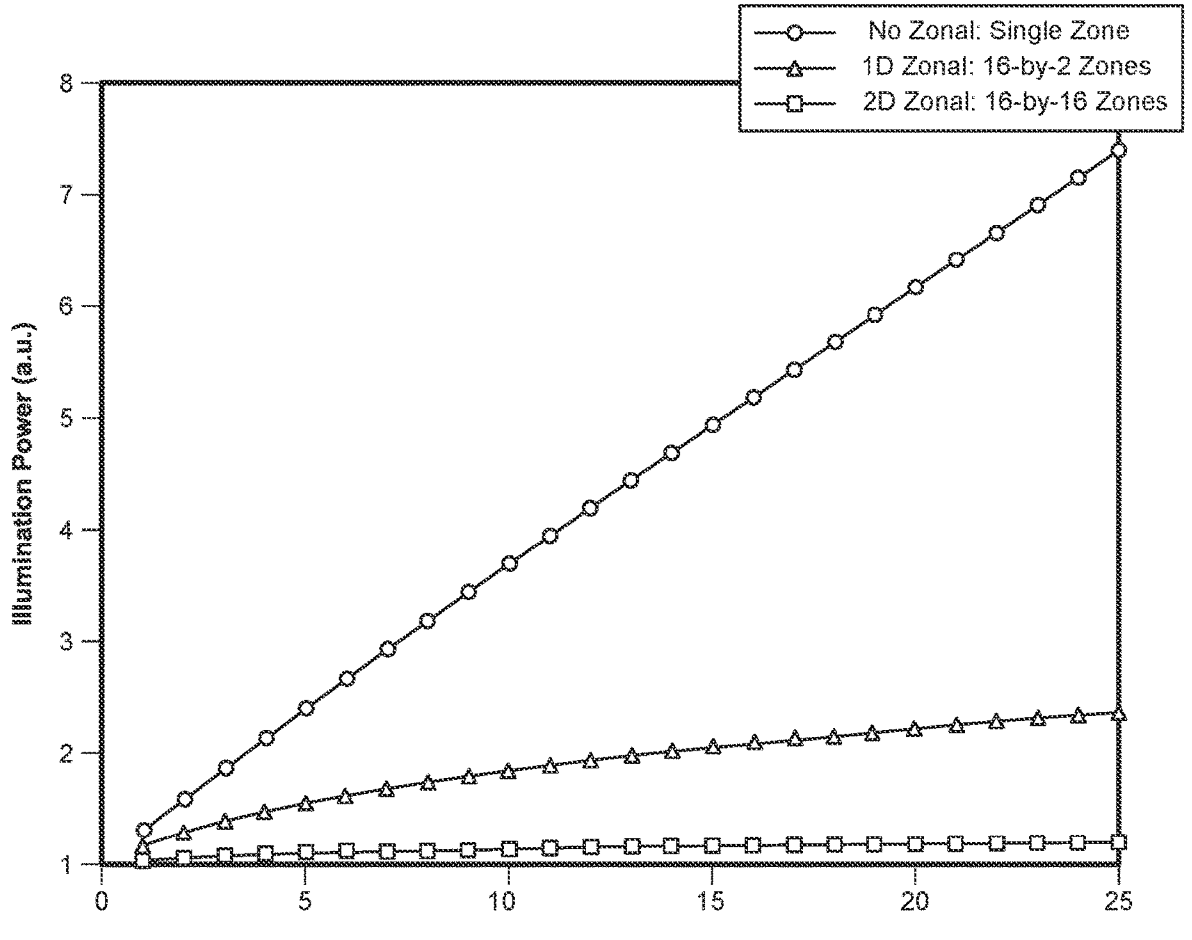
FIG. 22 shows zonal illumination power reductions, according to some examples.

FIG. 22 shows zonal illumination power reductions, according to some examples.

Figure 23:
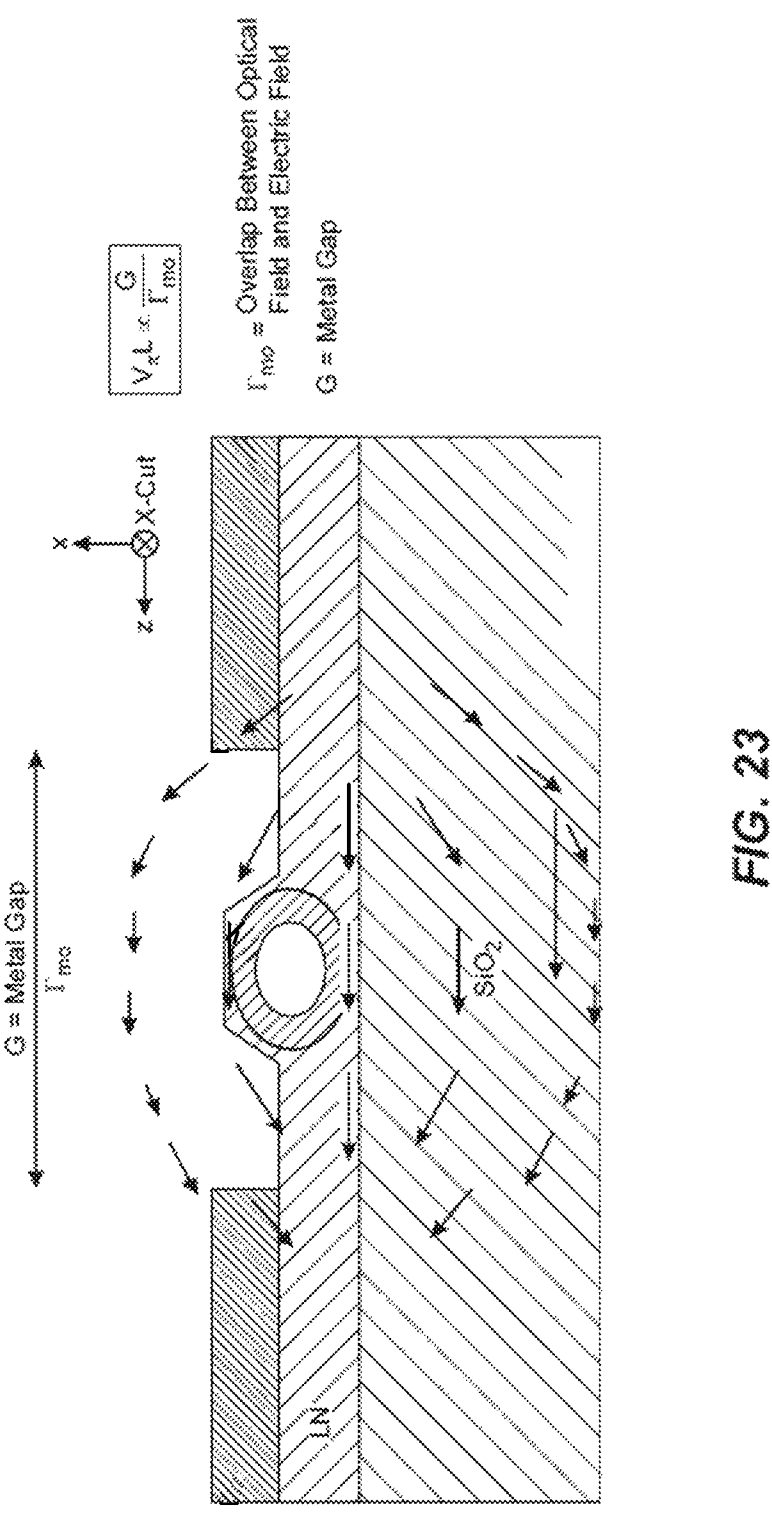
FIG. 23 shows that the half-wave voltage length product is linearly proportional to the gap between the metal electrodes in an electrooptic modulator, according to some examples.

FIG. 23 shows that the half-wave voltage length product is linearly proportional to the gap between the metal electrodes in an electrooptic modulator. In some examples, example electrooptical modulators can be used as optical switches to route light to each zone. The half-wave voltage length product may be linearly proportional to the gap between the metal electrodes. The metal electrodes can be fabricated using a combination of transparent and conductive materials to decrease the half-wave voltage length product and power consumption, as discussed above in relation to FIG. 16B.

In some examples, a zonal illuminator device may include one or more photonic integrated circuits and may be used with transmissive or reflective type displays. In some examples, a device may include one or more light sources, an active photonic circuit (e.g., an active PIC), and a passive photonic circuit (e.g., a passive PIC).

Figure 24:
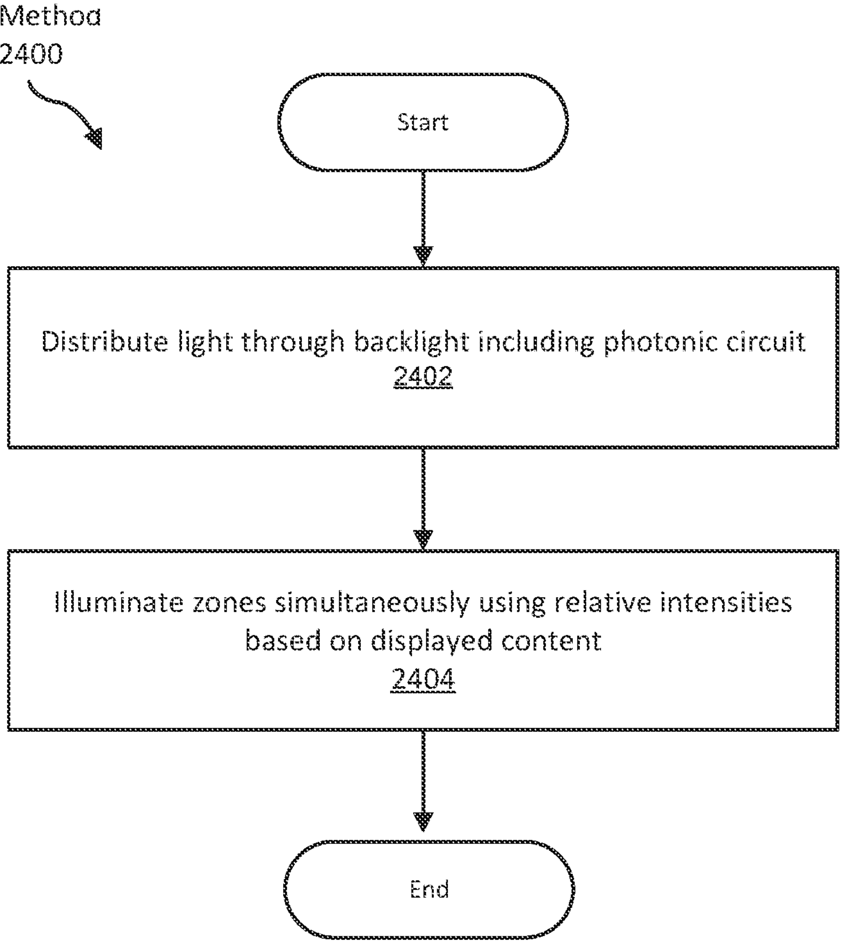
FIG. 24 shows a method according to some examples.

FIG. 24 shows a method according to some examples. In one example, at step 2402, the systems described herein may distribute light through a backlight including a photonic circuit. At step 2404, the systems described herein may illuminate zones simultaneously using relative intensities based on displayed content. For example, the systems described herein may illuminate a zone that is currently displaying an AR object but may not illuminate a zone that is not displaying any objects. In another example, the systems described herein may illuminate a zone where the user's gaze is directed (e.g., based on a gaze-detection system) and may not illuminate a zone where the user's gaze is not directed.

Figure 25:
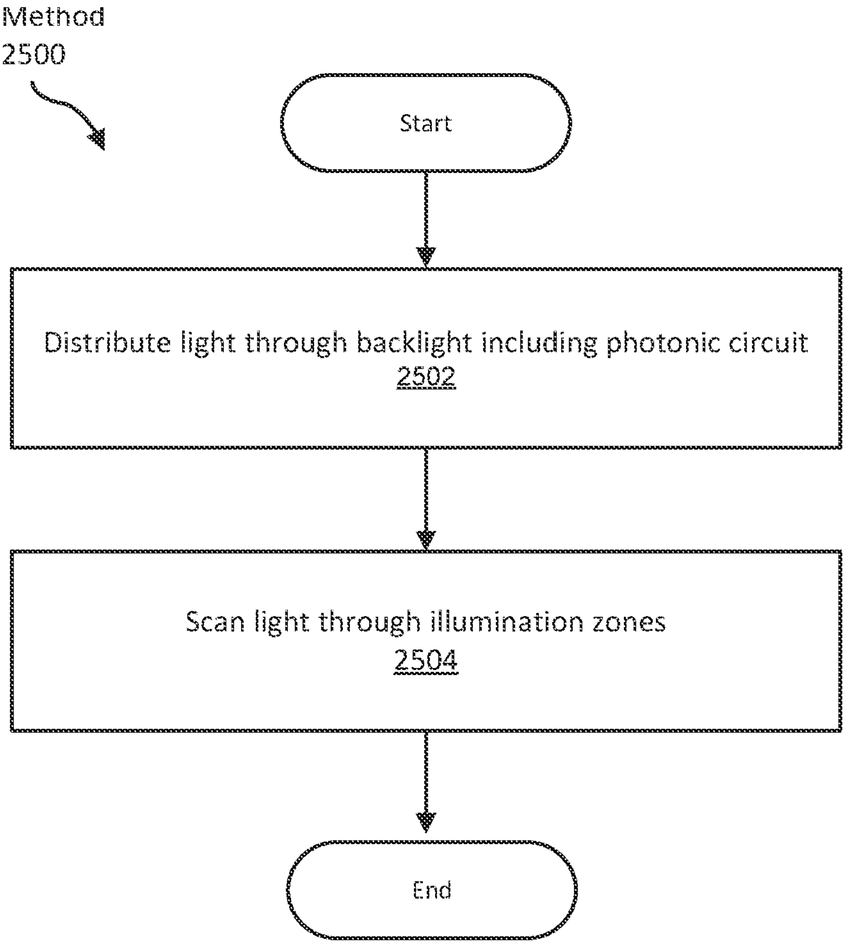
FIG. 25 shows a further method according to some examples.

FIG. 25 shows a further method according to some examples. In one example, at step 2502, the systems described herein may distribute light through a backlight including a photonic circuit. At step 2504, the systems described herein may scan light through illumination zones (e.g., via a raster scan and/or any other appropriate type of scan).

Zonal illumination (e.g., zonal backlight illumination or zonal reflective illumination) may use one or more photonic circuits. Zonal illumination may be used with transmissive and reflective type displays and may include routing light using an arrangement (e.g., an array) of optical modulators. A zonal illuminator for of a display may include photonic integrated circuits for transmissive and reflective type displays, and a display assembly may include a zonal illuminator (e.g., such as described herein) and a display (e.g., a liquid crystal display). In some examples, light may be scanned across the zones. In some examples, light may be simultaneously distributed to all the zones at a particular intensity based on the displayed content associated with the respective zone. In some examples, an arrangement (e.g., an array) including ring resonators may be used to achieve compact active light routing.

In some examples, one or more lasers may be used as a light source for a backlight unit for a display. Laser light may provide high brightness, high directionality, and may allow large color gamut (e.g., using color conversion modules). However, the delivery of laser light to the display panels is a challenging problem. Current AR waveguides exhibit severe nonuniformity, which is device and pupil position dependent. A display engine with dynamic zonal brightness control would be very useful to obtain an improved display performance and/or a reduced power operation.

In some examples, one or more lasers may be used as a light source for a backlight unit for a display. Laser light provides high brightness, high directionality, and may allow large color gamut (e.g., using a color conversion). Examples include the provision of laser light based display illumination, for example, a display backlight with dynamic zonal brightness control that provides improved display visual performance (e.g., improved illumination uniformity, e.g., compared to other laser light based backlights) and reduced power operation.

An example device may include one or more light sources, and/or may be configured to receive light from one or more light sources that may be located outside of the BLU. In some examples, a light source may include one or more of the following: a semiconductor laser (e.g., a laser diode, vertical cavity surface emitting laser (VCSEL), or other semiconductor laser), fiber laser, heterogeneously integrated laser, light emitting diode (LED), superluminescent LED, and/or nonlinearly converted light source, such as a pump laser combined with a nonlinear optical element, for example, second-harmonic generation (SHG), third harmonic generation (THG), four-wave mixing (FWM), difference-frequency generation (DFG), parametric downconversion (PDC), and the like. Light sources may be connected to the light distribution module through one or more of the following: optical fibers, nanowires, free-space edge coupling, or a waveguide grating coupler.

In some examples, a display assembly may include one or more modules configured to convert incident light into light of a different color. Color conversion modules may include one or more color-conversion materials that may absorb light within a certain wavelength range (e.g., absorb laser light), and emit light within a desired wavelength range (e.g., output red, green, yellow, white, orange, or other color light). An example color conversion material may include: a quantum well; semiconductor nanostructure or other types of nanostructure such as nanowires; quantum dots (e.g., semiconductor quantum dots), fluorescent materials (e.g., inorganic phosphors or fluorescent materials such as organic, polymer, or doped glass or semiconductor materials); or other suitable fluorescent materials.

Color conversion modules may also include one or more of any of the following: high and/or partial reflectivity film stacks to form a resonant cavity for the laser light to enhance absorption and consequently conversion efficiency; polarizers (e.g., wire-grid, particle, multi-stack, reflective polarizers, etc.); reflective polarizers, waveplates, and/or the reflective coatings configured to recycle any color-converted light having an unwanted polarization to improve output efficiency.

Example color conversion modules may include one or more of the following: a high/partial reflectivity film stack to form a resonant cavity for the laser light, for example to enhance absorption and consequently conversion efficiency; and/or one or more polarizers (e.g., wire-grid, particle, multi-stack, reflective polarizer, etc.). A reflective polarizer and/or a reflective coating may recycle the color-converted light in an unwanted polarization, and improve output efficiency. Light of the unwanted polarization may be reflected back into the cavity. An optical retarder, such as a quarter-wave plate, may be used to convert reflected light of unwanted polarization into the desired polarization.

Examples relate to illuminating a display (e.g., a liquid crystal display), for example, using different colors of light. In some examples, a photonic integrated circuit receives blue, violet, or near-UV light and conveys the light to a display portion. A color conversion module proximate the display portion converts parts of the blue light into red light and green light. The display portion can then be illuminated using red, green and blue light while needing only a single photonic network to distribute the blue light to the portion of the display. Red and green light can be generated locally proximate the display portion and separate photonic networks for the red and green light are not needed. In some examples, the photonic IC may transmit other pump light colors such as violet light or UV light, and color conversion modules may be used to generate blue, green (or yellow) and red light.

An example color conversion module may convert essentially monochromatic laser radiation into any desired color to illuminate display pixels or subpixels. A color conversion layer may include one or more color conversion modules, wherein each color conversion module is configured to convert an incident light color into a converted light color. In some examples, the incident light color may include blue, violet, or ultraviolet (UV) light. A device may include an arrangement (e.g., an array) of color conversion modules within a color conversion layer, and the color conversion modules may be physically aligned with respective zones, color pixels, or subpixels of a display. Color conversion modules may be used to convert light having a particular color into one or more different desired colors. Example apparatus may be used in head-mounted devices such as augmented reality and/or virtual reality devices.

Color conversion modules may be configured to convert the laser light (e.g., UV or blue laser light) into any light color of interest at the subpixel level. For example, color conversion modules may convert incident light (e.g., light such as blue, violet, or UV light) into red, yellow, orange, green, and/or blue light within appropriate zones, pixels or subpixels. For example, a color conversion module may convert blue laser light into red or green light at appropriate zones, pixels or subpixels. Light color conversion may be provided at the zone, pixel, or sub-pixel level as desired for improved visual appearance, ease of fabrication, and/or improved light efficiency.

In some examples, a device may include a photonic integrated circuit for only one color (e.g., blue, violet, UV, or other pump light color), which provides design simplification (e.g., relative to three different color photonic ICs) and allows relatively high performance.

An example color conversion module may be configured to receive laser radiation and provide one or more desired colors to illuminate the display. In some examples, the light may be laser radiation such as blue laser light. The blue light, along with red and green light generated by color conversion modules, may be used to illuminate the display. In some examples, the laser radiation may include UV light, such as near-UV light. Red, green and/or blue light may be generated by color conversion modules to illuminate the display.

An example color conversion module may include one or a combination of color-conversion materials that may absorb light within a particular wavelength range and emit light in the desired wavelength range (e.g., of a desired color). Color-conversion materials may include one or more of the following: quantum dots (e.g., semiconductor quantum dots having one or more radii), fluorescent materials; quantum wells (e.g., semiconductor quantum wells having one or more well thicknesses); nanowires (e.g., semiconductor nanowires); or other nanostructures.

Example color conversion modules may further include: a high/partial reflectivity film stack to form a resonant cavity for the laser light, for example to enhance absorption and consequently conversion efficiency; and/or one or more polarizers (e.g., wire-grid, particle, multi-stack, reflective polarizer, etc.).

A reflective polarizer and/or a reflective coating may recycle the color-converted light in an unwanted polarization, and improve output efficiency. Light of the unwanted polarization may be reflected back into the cavity. An optical retarder, such as a quarter-wave plate, may be used to convert reflected light of unwanted polarization into the desired polarization.

In some examples, a photonics integrated circuit (PIC) based backlight unit (BLU) may provide one or more of the following: color-separated sources for individual sub-pixels; high pixel density; high efficiency; and/or zonal dimming functionalities. An example BLU backplane, BLU, or device including a BLU may include a source light, a dynamic light distribution module, at least one outcoupling module, at least one beam spot generation module, at least one color-conversion module, and optionally one or more color filters. A module configuration may be designed for a specific application, such as an AR/VR device or other display application. The module design may provide high performance and relatively straightforward manufacturability.

In some examples, a photonic IC layer may include a single layer or multiple layers of photonic integrated circuits embedded in a substrate or other support material. An example photonic IC layer may include one or more of any of the following; waveguides, splitters, active light modulating components, and out-coupling components. In some examples, active photonic IC (APIC) components may include one or more of any of; an amplitude modulator, phase modulator, polarization modulator, any other modulator, couplers, other optical or electrooptical components, etc. APIC components may be driven by electronic circuitry built in the electronic IC layer and connected, for example, with vertical metallic vias or other electrical connections.

The materials and fabrication processes related to the photonic IC layer may be selected to be compatible with the fabrication of the electronic IC layers (e.g., selected based on processing temperature, material compatibility, etc.).

An example active waveguide may include one or more of the following: electro-optic materials (e.g., lithium niobate ($LiNbO_3$), barium titanate (BTO), aluminum nitride (AlN) and/or other III-V materials. In some examples, an active waveguide may include one or more electro-optic polymers. Electro-optic materials may be formed as part of an example waveguide structure and electrodes may be located to apply an electrical signal across the electro-optic material.

In some examples, a waveguide may include a thermo-optic material, for example, as part the waveguide structure. One or more micro-heating elements may be located proximate the thermo-optic material.

In some examples, a waveguide may include one or more mechanical movable parts, for example, controlled using piezo-electric, electrostatic or other mechanisms. A mechanical movable part may be adjusted to change the geometry or the arrangement of waveguide(s) or other component(s), for example, using one or more control mechanisms.

In some examples, a waveguide may include a phase change material (e.g., as part the waveguide structure) which may be modified using one or more proximate micro-heating elements. In some examples, a waveguide may include a micro-fluidic channel as part of the waveguide structure, along with one or more proximate fluidic control mechanisms. In some examples, a waveguide may include a liquid crystal as part of the waveguide structure, for examples, with electrodes positioned to realign the orientation of at least a portion of the liquid crystal.

Light channels may be configured to connect the output of the light distribution module and one or more out-couplers. An example light channel may include one or more of any of the following: a waveguide, an amplitude modulator, and/or a phase modulator. An example waveguide may include a single-mode waveguide (e.g., rectangular, ridge, rib, or other type of waveguide), and/or a multi-mode waveguide. An amplitude modulator may include one or more of the following: an MZI, a ring modulator (e.g., a micro-ring modulator), a tunable-absorption waveguide, photonic crystal (PhC) cavity, and/or a mechanically adjustable component. A phase modulator may be configured to scramble the relative phase of signals provided by each out-coupler.

A photonics circuit (e.g., a PIC) may include one or more out-couplers configured to direct a portion of light transmitted along a waveguide to illuminate a zone of the display.

Any structure or component of the photonic circuit (which may include a light distribution module) may include one or more active components (e.g., active waveguides and/or optical switches) to achieve dynamic tunability and/or switching, such that the intensity ratio between particular display zones may be dynamically varied (e.g., for local dimming and/or global dimming functionality). In some examples, the total output intensity of a light source may be adjusted to adjust any desired combination of local dimming and/or global dimming.

A light distribution module may receive light from one or light sources and distribute the light as desired, for example, between a plurality of waveguides. Example light distribution modules may be static (e.g., for power splitting), or may be dynamic and/or reconfigurable (e.g., for zonal illumination with a local dimming function).

An example light distribution module may include one or more of any of the following: isolators, waveguides, beam-splitters and cascaded trees of any combination, additional modulators or redistributors, and/or an additional phase modulator. Example isolators may be located between each light source and the rest of the light distribution module to block reflected light from entering the light sources. Waveguides may include rectangular, rib, ridge, or any lithographically defined and fabricated waveguides; direct laser written waveguides; ion-diffusion and/or ion implanted waveguides; and/or holographically defined and developed waveguides. Beam splitters and cascaded trees of any combination may include: fiber-based beam splitters; on-chip star couplers or evanescent star couplers; multi-mode interferometer (MMI) couplers, Y-splitters or other directional couplers; and/or resonator based (e.g., photonic crystal based) couplers. Additional amplitude modulator or redistributors may include a Mach-Zehnder interferometer (MZI); micro-ring devices; tunable-absorption waveguides; photonic crystal (PhC) cavities; and/or mechanically movable components (e.g., using MEMS devices, actuators, electrostatic distortion, piezoelectric, or flexoelectric devices). An additional phase modulator may be used, for example, to scramble the relative phase of laser light out of each row.

A light distribution module may be configured to distribute light from one or more light sources into a number of light channels (e.g., waveguides) distributed in one or more layers. The light distribution module may be located on a side of the display module, or it may also be distributed within a photonic chip.

An example light distribution module may include one or more of the following components: optical isolators, waveguides, beam splitters, lenses, optical couplers, active optical components, and the like. For example, one or more optical isolators may include: an isolator between each light source and the remainder of the light distribution module to block reflected light from entering the light sources. Waveguides may include: rectangular, rib, ridge, or any lithographically defined and fabricated waveguides; direct laser written waveguides; ion-diffusion/implanted waveguides; and/or holographically defined and developed waveguides. Beam splitters may include cascaded trees of any combination, including fiber-based beam splitters, on-chip star couplers, MMI (multi-mode interferometer) couplers, MZI (Mach-Zehnder interferometer) or other directional coupler, and/or Y-splitters. In some examples, optical couplers may include resonator-based (e.g., photonic crystal) couplers. In some examples, a device may include one or more active (or dynamic) light distribution modules which may be configured to allow adjustment of one or more light levels at one or more display zones, or over the entire display.

In some examples, a device may include a laser, a dynamic light distribution module, a photonics circuit, and a display, where the dynamic light distribution module is configured to receive laser light from the laser and transmit the laser light to illuminate one or more zones of the display. a dynamic light distribution module may allow a relative adjustment between light intensities directed towards various respective waveguides. In some examples, the device may be a head-mounted device, such as an augmented reality device and/or a virtual reality device.

An example out-coupling module (or out-coupler) may out-couple light propagating in the waveguide into an out-of-plane direction to illuminate a display. An example out-coupler may include one or more of any of the following: a grating coupler, an arrangement of scatterers, an antireflection coating, other grating structures, or an holographic optical element (HOE). An example grating coupler may have a 1D, 2D or 3D grating profile, and the grating coupler may be etched directly into the waveguide or may be separate from but proximate to the waveguide. For example, there may be evanescent optical coupling between the waveguide and the grating coupler. An arrangement (e.g., an array) of scatterers may include non-resonant and/or resonant structures) and may be fabricated proximate the waveguide layer(s). Scatterers may include meta-grating scatterers, for example, including a multilayer and/or resonant scatterers. An anti-reflective (AR) coating may be formed on the other side of the waveguide to increase the coupling efficiency and reduce unwanted light leakage and loss. An example AR coating may include one or more stacked layers of dielectric, metallic or semiconductor materials. Grating structures may include a volumetric Bragg grating. A holographic optical element (HOE) may include any suitable optical element, such as a liquid-crystal based polarization volume hologram.

Example out-couplers may include straight or oblique grating elements, which may be formed on, in, or proximate to but separated from a waveguide. An example AR coating may be formed on the opposite side of the grating from the out-couplers. In some examples, different out-couplers may be formed at different locations within the BLU. For example, oblique gratings may be formed near an edge portion of the BLU.

Out-coupling components may include waveguide grating couplers, ring resonators, side-coupled scatterers, etc. Example gratings may include multi-material-layers, multi-etch-depth, straight or slanted gratings, or any combination. An example photonic IC layer may include a dielectric or metallic high reflection (HR) layer located beneath the photonic IC to improve the out-coupling efficiency. In this example, the term "beneath" may refer to the other side of the photonic IC to the display.

An example out-coupling structure (which may be referred to as an out-coupler) may out-couple light propagating in a waveguide into an out-of-plane direction, for example, to illuminate a display. An example out-coupler may include one or more of any of the following: a grating coupler, an arrangement of scatterers, an antireflection coating, other grating structures, or an holographic optical element (HOE). An example grating coupler may have a 1D, 2D or 3D grating profile, and the grating coupler may be etched directly into the waveguide or may be separate from but proximate to the waveguide. For example, there may be evanescent optical coupling between the waveguide and the grating coupler. An arrangement (e.g., an array) of scatterers may include non-resonant and/or resonant structures) and may be fabricated proximate the waveguide layer(s). Scatterers may include meta-grating scatterers, for example, including a multilayer and/or resonant scatterers. An anti-reflective (AR) coating may be formed on the other side of the waveguide to increase the coupling efficiency and reduce unwanted light leakage and loss. An example AR coating may include one or more stacked layers of dielectric, metallic or semiconductor materials. Grating structures may include a volumetric Bragg grating. A holographic optical element (HOE) may include any suitable optical element, such as a liquid-crystal based polarization volume hologram.

Example out-couplers may include straight or oblique grating elements, which may be formed on, in, or proximate to but separated from a waveguide. An example AR coating may be formed on the opposite side of the grating from the out-couplers. In some examples, different out-couplers may be formed at different locations within the BLU. For example, oblique gratings may be formed near an edge portion of the BLU. In some examples, an out-coupler or other photonics circuit component may include a beam reshaping element, such as a focusing element and/or a beam steering element.

An example beam reshaping element may, for example, direct light in a particular direction and/or improve beam quality to reduce stray light or other light loss mechanisms. An example beam reshaping element may include micro-focusing elements such as an arrangement of microlenses. Example micro-focusing elements may include one or more of the following: microlenses (e.g., a microlens arrangement such as a microlens array); meta-lenses (e.g., including one or more structured effective index component); layered structures with effective focusing power; gradient index lenses; or HOEs (holographic optical elements) or other types of diffractive lens. In some examples, light may be focused into the finite openings of a display panel for improved light efficiency, for example, by a beam reshaping element.

An example beam spot generation module may be configured to receive a output beam profile (e.g., approximately Gaussian-like profile) from an out-coupler and generate an array of uniform spots at a given distance that may then propagate through the display panel. In some examples, a beam spot generation module may be located to receive light from an out-coupler or light source. In some examples, different out-coupler region within a waveguide segment may be direct light to different beam spot generation modules configured such that they generate spatially overlapping beam spot arrays at a desired plane or location, which may provide redundancy (e.g., tolerance to loss of a waveguide function).

An example beam spot generation module may include one or more of any of the following: a meta-surface (e.g., a metamaterial element); a diffractive optical element; a holographic optical element; and/or a volume holographic optical element. Out-couplers and a spot array generator may be integrated as a single module by suitably configuring the local phase and coupling strength of the out-coupled light across the out-coupling region.

Focusing elements may include one or more of the following: microlenses, meta-lenses, adjustable lenses (e.g., fluid lenses), layered structures, gradient-index lenses, or a diffractive optical element (DOE). Micro-lenses may be arranged in arrays. A meta-lens may include a structured effective index configuration, such as a metamaterial lens. Layered structures may have an effective focusing power. Gradient index lenses may include a refractive index profile configured to provide desired focusing. Diffractive optical elements may include gratings, photonic crystals, or any other suitable diffractive optical element.

In some examples, a backlight unit having local (zonal) dimming functionalities. A device may include only one laser source and a simple integrated light routing and control network. Local dimming and energy redistribution may be achieved using an active light distribution module. Only one out-coupler design (e.g., with high out-coupling efficiency) may be used per local zone per color. A redundant design may be tolerant of individual light channel failure.

In some examples, an apparatus may include a backlight unit (BLU) including a light source such as a laser, a dynamic light distribution module, and a photonic circuit. The dynamic light distribution module may be used to adjust the relative and/or absolute intensities of light directed to each of a plurality of waveguides. In some examples, a BLU may be configured to receive laser light from an external laser source. Laser light may be transmitted to various zones of the backlight unit and zonal illumination may be controlled using the dynamic light distribution module. In some examples, dynamic electrooptical control of light transmission intensities along a waveguide may be used to achieve global and/or local dimming of a display, such an AR/VR display or television display.

An example electronic control circuit may include electronic bus lines for power distribution, control lines, data lines and integrated electronic circuitry for active LC cell control. Vertical metallic vias or other electrical connections may be used to electrically connect the electronic IC layer and the display interface, in this example, an active pixel interface.

An example electronic IC layer may include the circuitry for each active pixel to drive LC, and may be connected to the display interface through metallic vias or other electrical connections. Metallic vias may extend vertically upwards (e.g., normal to the plane of the display panel) and through the photonic IC layer, but may be spatially distant from light-guiding waveguides and may not interfere with the operation of the photonic IC layer.

An example electronic IC layer may include circuitry for active photonic components in the photonic IC layer, which may be connected through vertical metallic vias or other electrical connections. An example electronic IC layer may include other circuitry to process the data for display to improve the power consumption and data processing and transfer speed. An example electronic IC layer may include power, data and other electronic bus lines.

Electrically conductive connections (e.g., tracks, vias, and the like) may electrically interconnect the control circuit and a display interface, allowing a higher fill factor and a brighter display. The control circuit may also control active optical components in the photonics circuit layer. The display interface may support a liquid crystal display (LCD) or any other suitable display technology. Examples devices may include a backlight unit (BLU) having an integrated laser, photonic IC, and color conversion elements. In some examples, the backlight may provide adjustable illumination of one or more backlight zones.

An example device may include a plurality of layers that may be fabricated in sequence using standard lithographic manufacturing process. An LC display interface may include an anti-reflection coating, pixelated conducting pads for liquid crystal cells, a black matrix layer, and/or other components. A photonics circuit may include single-layer or multi-layer light-guiding waveguides and out-coupling components, anti-reflection layers, or other components. An electronic control circuit may include active and/or passive electronic components configured to control operation of one or more of pixel switching, light source illumination, active optical switch control, or other function.

A photonics circuit based display backlight architecture may provide a compact, high-efficiency, high-PPI and cost-effective display that supports a laser light source and provides an excellent color gamut. In some examples, a backlight may be fabricated using standard lithographic manufacturing processes to form an LC display interface, one or more photonics circuits, and an electronic control circuit. The integration of these layers allows use with both front-lit and back-lit display panels.

An example device (e.g., including an integrated display backplane) may be fabricated using standard lithography-based nano-manufacturing process for both electronic IC, photonic IC, color conversion, and display backplane components, and is scalable to wafer or panel level manufacturing. An example device may include integration of an display interface, an electronic IC layer, a photonic IC layer and color conversion modules to provide a more compact form factor, less weight, and reduced system complexity.

In some examples, a device may not require high-precision post-fabrication alignment between a PIC-BLU and the active pixel display interface. An example device may not require high-precision alignment between the bottom of the device (e.g., having LC pixel opening windows) and the top substrate of the LC device (e.g., with black matrix opening). The distance between the photonic IC layer and the light-modulating layer may be greatly reduced, improving the total performance (including reduced optical crosstalk between neighboring pixels, improved light efficiency, and emission cone control) of the display panel. Example devices allow displays with higher PPI (pixel resolution).

In some examples, an example backlight unit may be integrated with on-chip laser sources and a display to provide a stand-alone display module. Alternatively, a device may be configured to receive laser radiation from at least one external laser source. In some examples, a device may be integrated with further silicon IC modules, for example, for more power-efficient data processing and transfer.

Improved uniformity is highly desirable for LED-based or laser-based backlights. A diffuser may be used to improve uniformity, particularly with laser illumination, but adds weight. In some examples, the described backlights provide sufficient uniformity to allow the diffuser to be omitted, saving weight and providing improved performance. In some examples, a narrowband filter may be included at each RGB sub-pixel to remove any stray light of unwanted color and to reduce crosstalk. In some examples, an optical isolator may be used to prevent stray light being reflected or scattered back into the light source.

An example LC display interface may include an optical coating, for example, providing an anti-reflection layer for single-pass operation of LC cells or partial reflection for resonance-based LC cell operation. An example active pixel display interface may include pixelated electrodes that may provide individual electric control signal (voltage) to each LC pixel cell. An example active pixel display interface may include an alignment layer, for example, including a micro-structured surface that may be lithographically fabricated, or based on materials that may be spun on top of the device.

Materials and fabrication process of the LC display interface may be selected to be compatible with the fabrication of the photonic and electronic IC layers (e.g., maximum processing temperature, material compatibility, and the like).

The liquid crystal interface layer may include one or more transparent electrodes (e.g., stripe electrodes) and an alignment layer. Electrodes may include a transparent conductive oxide such as indium tin oxide. The alignment layer may include a polymer (e.g., a rubbed or otherwise at least partially aligned polymer), a liquid crystal layer (e.g., including a nematic liquid crystal) may be located adjacent the alignment layer, such as a rubbed polymer, and the liquid crystal layer may be located between the LC display interface and a second substrate supporting a second alignment layer and orthogonal stripe electrodes proximate the liquid crystal layer.

An example control circuit may be fabricated using CMOS (e.g., PMOS/NMOS) technology based on silicon wafers (similar to LCoS technology), or using TFT technology (e.g., using α-Si, LTPS, organic-TFT, oxide-TFT, LTPS+oxide-TFT, etc.) on a transparent substrates. Processes may be adapted from those used to fabricate active matrix liquid crystal display panels.

In some examples, augmented reality and/or virtual reality (AR/VR) devices may include a display configured to provide virtual or augmented reality elements. In augmented reality (AR), the AR image elements may be combined with light from an external environment. Examples may include a display backlight that may include at least one laser and an active photonic integrated circuit (APIC) to illuminate various backlight zones of the display. For examples, laser radiation may be distributed using waveguides and light out-coupler elements may be located near the center of each zone (e.g., the center of a pixel or a group of pixels). Light intensity within each zone may be controlled using active optical components. Laser radiation may include UV or blue light, and color conversion elements may be used to obtain any other desired colors. Color conversion elements may include fluorescent materials and may be arranged within sub-pixels. Color conversion elements may optionally include an optical resonator and include additional focusing elements. Examples further include a backlight unit (BLU) including an integrated laser and color conversion elements. The backlight may provide adjustable illumination of one or more backlight zones.

Compact displays are useful for AR/VR systems. For LCOS or LCD/TFT based displays, the light illumination module typically takes up a lot of space. A laser BLU architecture may integrate the electronic and photonic integrated circuits, greatly reducing the complexity, footprint, weight and size of the display. Reduced weight is desirable for applications in head-mounted devices. Reduced power consumption is desirable for portable applications, including head-mounted devices, as this allows reduced battery weight and/or increased battery lifetime.

In some examples, an active photonics integrated circuit (APIC) based laser back light unit may provide one or more of the following: color-separated sources for individual sub-pixels; high pixel density; high efficiency; and/or zonal dimming functionalities. An example BLU backplane, BLU, or device including a BLU may include a source light, a dynamic light distribution module, at least one outcoupling module, at least one beam spot generation module, at least one color-conversion module, and optionally one or more color filters. A module configuration may be designed for a specific application, such as an AR/VR device or other display application. The module design may provide high performance and relatively straightforward manufacturability.

Technical advantages may include an efficient laser backlight unit having local (zonal) dimming functionalities. A device may include only one laser source and a simple integrated light routing and control network. Local dimming and energy redistribution may be achieved using an active light distribution module. Only one out-coupler design (e.g., with high out-coupling efficiency) may be used per local zone per color. A redundant design may be tolerant of individual light channel failure. In some examples, light may be focused into the finite opening of display panels for improved light efficiency. Light color conversion may be provided at the sub-pixel level for better light efficiency. In some examples discussed further below, a device may not require alignment at the pixel level between the outcoupling module and a beam spot generation module.

In some examples, a controller may include a video signal analyzer configured to determine the relative brightness of zones of displayed content. In some examples, a histogram analysis or other analysis may be used to determine a brightest pixel for each zone. Zonal illumination intensity may be based on the brightest pixel within the zone or other parameter related to displayed content brightness.

Some or all electronic components (e.g., power lines, signal lines and control circuitry for the light sources) and the dynamic light distribution module may be fabricated either on top or bottom of the photonic layer and connected to the active components through conducting vertical vias.

Some or all electronic components, including power lines, signal lines and control circuitry for the light sources as well as the dynamic light distribution module may be located on the side of the chip or even on a separate chip and connected to the active components through metallic or conducting wire network fabricated on the main chip.

In some examples, electric fields may be used to modify optical properties of, for example, a waveguide and may be used to vary the backlight illumination in various portions of a backlight unit, for example, based on the brightness of the corresponding portion of an image shown on the display.

An example display module may include one or more of any of the following: transmissive LCOS; transmissive FLCOS; TFT (thin film transistor)+LC (liquid crystal) (e.g., active matrix liquid crystal display).

Displays may include novel pixelated display panels in which each pixel may include one or more of any of the following: active optical materials that may modify an optical response by external electric field or electric current; and/or structures that may modify the optical response using an external electric field or electric current.

An example light modulation module may include one or more of any of the following: LCOS (liquid crystal on silicon); ferroelectric LCOS; TFT-LC (thin-film transistor liquid crystal, or active matrix configurations); polymer-based EO display panels (e.g., including electroluminescent polymers, polymer stabilized or encapsulated liquid crystals); and/or organic or inorganic semiconductor material-based display panels.

In some examples, a pixelated display panel may be configured so that pixels may include one or more of the following; active optical materials (e.g., EO polymers, organic semiconductor materials, EO materials, EO ceramics, phase change materials, 2D materials, ITO) that may have optical properties that may be modified by an applied electric field or current. Example pixels may further include structures that can modify the optical response by an electric field or current. Examples further include emissive displays where an image may be formed by electrooptical control of waveguide elements.

In some examples, a device (e.g., a BLU module, a display, or a display including a backlight) may be used with a liquid crystal display, such as transmissive LCOS (liquid crystal on silicon), transmissive FLCOS (ferroelectric liquid crystal on silicon), active matrix nematic liquid crystal, TFT, or any other suitable display technology. In some examples, a light source may include one or more of the following: a semiconductor laser (e.g., a laser diode, vertical cavity surface emitting laser (VCSEL), or other semiconductor laser), fiber laser, heterogeneously integrated laser, light emitting diode (LED), superluminescent LED, and/or non-linearly converted light source, such as a pump laser combined with a nonlinear optical element, for example, second-harmonic generation (SHG), third harmonic generation (THG), four-wave mixing (FWM), difference-frequency generation (DFG), parametric downconversion (PDC), and the like. Light sources may be connected to the light distribution module through one or more of the following: optical fibers, nanowires, free-space edge coupling, or a waveguide grating couples.

In some examples, an apparatus includes at least one physical processor and physical memory including computer-executable instructions that, when executed by the physical processor, cause the physical processor to control the apparatus to perform a method such as described herein. In some examples, a non-transitory computer-readable medium includes one or more computer-executable instructions that, when executed by at least one processor of a computing device, cause the computing device to perform a method such as described herein. In some examples, an apparatus may include at least one physical processor and physical memory including computer-executable instructions that, when executed by the physical processor, cause the physical processor to control an apparatus, for example, using a method such as described herein, for example, to control a display and/or backlight assembly.

In some examples, a method of illuminating a display includes transmitting laser light along a waveguide, outcoupling the laser light towards a display. In some examples, a color conversion module may be used to generate converted light having one or more different light colors, and illuminating the display.

Examples further include computer-implemented methods corresponding to methods such as described herein. Example methods include computer-implemented methods for operating or fabricating an apparatus, such as various apparatus as described herein. The steps of an example method, such as adhering components together, may be performed by any suitable computer-executable code and/or computing system. In some examples, one or more of the steps of an example method may represent an algorithm whose structure includes and/or may be represented by multiple sub-steps. In some examples, a non-transitory computer-readable medium including one or more computer-executable instructions that, when executed by at least one processor of a computing device, cause the computing device to perform a method as described herein such as driving an electronic display, such as a liquid crystal display. In some examples, a computer-implemented method may include a method such as described herein. In some examples, a method for assembling an optical device such as an AR/VR device may include computer control of an apparatus. In some examples, a non-transitory computer-readable medium may include one or more computer-executable instructions that, when executed by at least one processor of an apparatus, cause the apparatus to at least partially assemble or operate an electronic device such as an AR/VR device, for example, using a method such as described herein. In some examples, a non-transitory computer-readable medium may include one or more computer-executable instructions that, when executed by at least one processor of an apparatus, cause the apparatus to at least partially operate an electronic device such as an AR/VR device, for example, using a method such as described herein.

In some examples, a method of illuminating a display includes transmitting laser light along a waveguide, out-coupling the laser light into a color conversion module, using the color conversion module to generate a different light color using the color conversion module, and illuminating a display using the different light color.

In some examples, a device may include at least one physical processor and physical memory including computer-executable instructions that, when executed by the physical processor, cause the physical processor to control the apparatus to perform a method such as described herein.

Examples include approaches to illuminating a display, such as a liquid crystal display (LCD) panel or liquid crystal on silicon (LCOS) display. In some examples, a light source (such as a laser) directs light into a photonic integrated circuit (PIC). The PIC may include waveguides configured to distribute the light to illuminate various zones of the display. For example, an active PIC may include optical switches that allow particular waveguides to be raster scanned, with light then further distributed using a passive PIC. Illumination intensity for each zone may be controlled using optical switches and/or with variation of the light source intensity (e.g., time synchronized with a raster scan). In some examples, the illumination intensity for each zone can be varied based on the displayed content, allowing improved contrast ratios. In some examples, all zones may be illuminated simultaneously. Example configurations may include red, green and blue laser diodes with waveguides arranged as a folded optical tree to illuminate the display zones. Example optical switches may include electrically controlled Mach-Zehnder interferometers and ring resonators. Advantages may include improved efficiency, reduced display power consumption and improved contrast ratio.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 2600 in FIG. 26) or that visually immerses a user in an artificial reality (such as, e.g., virtual-reality system 2700 in FIG. 27). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 26:
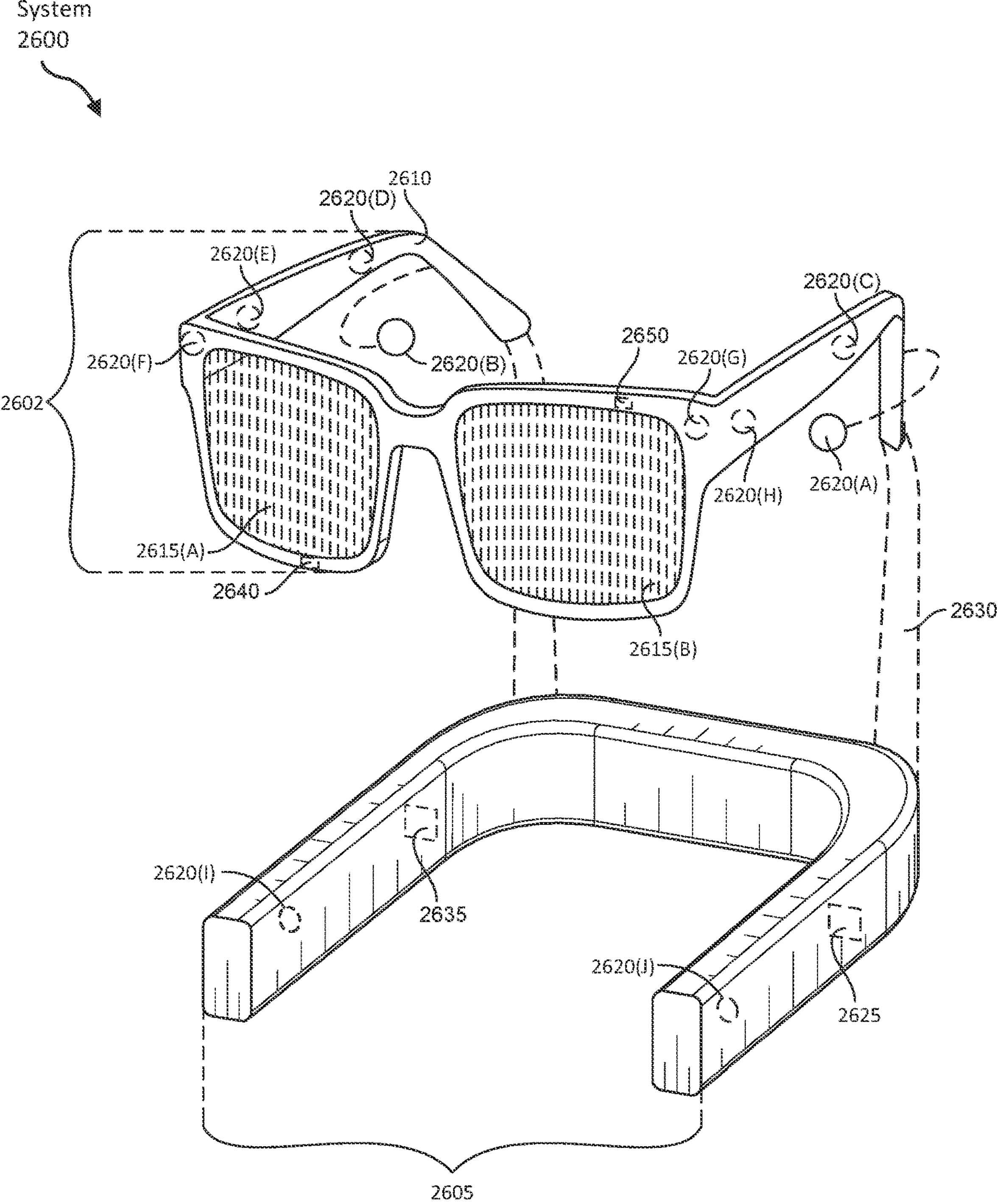
FIG. 26 is an illustration of exemplary augmented-reality glasses that may be used in connection with examples of this disclosure.
Figure 27:
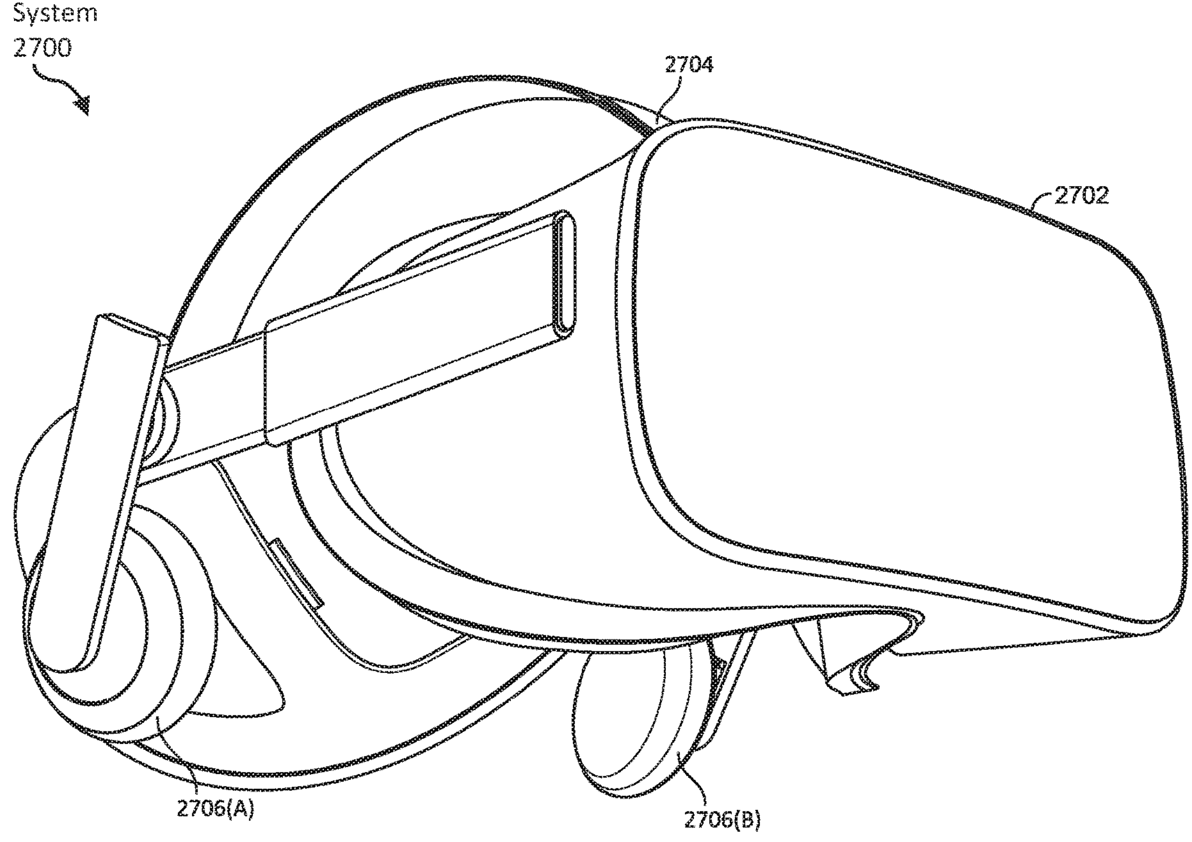
FIG. 27 is an illustration of an exemplary virtual-reality headset that may be used in connection with examples of this disclosure.

Turning to FIG. 26, augmented-reality system 2600 may include an eyewear device 2602 with a frame 2610 configured to hold a left display device 2615(A) and a right display device 2615(B) in front of a user's eyes. Display devices 2615(A) and 2615(B) may act together or independently to present an image or series of images to a user. While augmented-reality system 2600 includes two displays, embodiments of this disclosure may be implemented in augmented-reality systems with a single NED or more than two NEDs.

In some embodiments, augmented-reality system 2600 may include one or more sensors, such as sensor 2640. Sensor 2640 may generate measurement signals in response to motion of augmented-reality system 2600 and may be located on substantially any portion of frame 2610. Sensor 2640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 2600 may or may not include sensor 2640 or may include more than one sensor. In embodiments in which sensor 2640 includes an IMU, the IMU may generate calibration data based on measurement signals from sensor 2640. Examples of sensor 2640 may include, without limitation, accelerometers, gyroscopes, magnetometers, other suitable types of sensors that detect motion, sensors used for error correction of the IMU, or some combination thereof.

In some examples, augmented-reality system 2600 may also include a microphone array with a plurality of acoustic transducers 2620(A)-2620(J), referred to collectively as acoustic transducers 2620. Acoustic transducers 2620 may represent transducers that detect air pressure variations induced by sound waves. Each acoustic transducer 2620 may be configured to detect sound and convert the detected sound into an electronic format (e.g., an analog or digital format). The microphone array in FIG. 26 may include, for example, ten acoustic transducers: 2620(A) and 2620(B), which may be designed to be placed inside a corresponding ear of the user, acoustic transducers 2620(C), 2620(D), 2620(E), 2620(F), 2620(G), and 2620(H), which may be positioned at various locations on frame 2610, and/or acoustic transducers 2620(I) and 2620(J), which may be positioned on a corresponding neckband 2605.

In some embodiments, one or more of acoustic transducers 2620(A)-(J) may be used as output transducers (e.g., speakers). For example, acoustic transducers 2620(A) and/or 2620(B) may be earbuds or any other suitable type of headphone or speaker.

The configuration of acoustic transducers 2620 of the microphone array may vary. While augmented-reality system 2600 is shown in FIG. 26 as having ten acoustic transducers 2620, the number of acoustic transducers 2620 may be greater or less than ten. In some embodiments, using higher numbers of acoustic transducers 2620 may increase the amount of audio information collected and/or the sensitivity and accuracy of the audio information. In contrast, using a lower number of acoustic transducers 2620 may decrease the computing power required by an associated controller 2650 to process the collected audio information. In addition, the position of each acoustic transducer 2620 of the microphone array may vary. For example, the position of an acoustic transducer 2620 may include a defined position on the user, a defined coordinate on frame 2610, an orientation associated with each acoustic transducer 2620, or some combination thereof.

Acoustic transducers 2620(A) and 2620(B) may be positioned on different parts of the user's ear, such as behind the pinna, behind the tragus, and/or within the auricle or fossa. Or, there may be additional acoustic transducers 2620 on or surrounding the ear in addition to acoustic transducers 2620 inside the ear canal. Having an acoustic transducer 2620 positioned next to an ear canal of a user may enable the microphone array to collect information on how sounds arrive at the ear canal. By positioning at least two of acoustic transducers 2620 on either side of a user's head (e.g., as binaural microphones), augmented-reality system 2600 may simulate binaural hearing and capture a 3D stereo sound field around about a user's head. In some embodiments, acoustic transducers 2620(A) and 2620(B) may be connected to augmented-reality system 2600 via a wired connection 2630, and in other embodiments acoustic transducers 2620(A) and 2620(B) may be connected to augmented-reality system 2600 via a wireless connection (e.g., a BLUETOOTH connection). In still other embodiments, acoustic transducers 2620(A) and 2620(B) may not be used at all in conjunction with augmented-reality system 2600.

Acoustic transducers 2620 on frame 2610 may be positioned in a variety of different ways, including along the length of the temples, across the bridge, above or below display devices 2615(A) and 2615(B), or some combination thereof. Acoustic transducers 2620 may also be oriented such that the microphone array is able to detect sounds in a wide range of directions surrounding the user wearing the augmented-reality system 2600. In some embodiments, an optimization process may be performed during manufacturing of augmented-reality system 2600 to determine relative positioning of each acoustic transducer 2620 in the microphone array.

In some examples, augmented-reality system 2600 may include or be connected to an external device (e.g., a paired device), such as neckband 2605. Neckband 2605 generally represents any type or form of paired device. Thus, the following discussion of neckband 2605 may also apply to various other paired devices, such as charging cases, smart watches, smart phones, wrist bands, other wearable devices, hand-held controllers, tablet computers, laptop computers, other external compute devices, etc.

As shown, neckband 2605 may be coupled to eyewear device 2602 via one or more connectors. The connectors may be wired or wireless and may include electrical and/or non-electrical (e.g., structural) components. In some cases, eyewear device 2602 and neckband 2605 may operate independently without any wired or wireless connection between them. While FIG. 26 illustrates the components of eyewear device 2602 and neckband 2605 in example locations on eyewear device 2602 and neckband 2605, the components may be located elsewhere and/or distributed differently on eyewear device 2602 and/or neckband 2605. In some embodiments, the components of eyewear device 2602 and neckband 2605 may be located on one or more additional peripheral devices paired with eyewear device 2602, neckband 2605, or some combination thereof.

Pairing external devices, such as neckband 2605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2600 may be provided by a paired device or shared between a paired device and an eyewear device, thus reducing the weight, heat profile, and form factor of the eyewear device overall while still retaining desired functionality. For example, neckband 2605 may allow components that would otherwise be included on an eyewear device to be included in neckband 2605 since users may tolerate a heavier weight load on their shoulders than they would tolerate on their heads. Neckband 2605 may also have a larger surface area over which to diffuse and disperse heat to the ambient environment. Thus, neckband 2605 may allow for greater battery and computation capacity than might otherwise have been possible on a stand-alone eyewear device. Since weight carried in neckband 2605 may be less invasive to a user than weight carried in eyewear device 2602, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 2605 may be communicatively coupled with eyewear device 2602 and/or to other devices. These other devices may provide certain functions (e.g., tracking, localizing, depth mapping, processing, storage, etc.) to augmented-reality system 2600. In the embodiment of FIG. 26, neckband 2605 may include two acoustic transducers (e.g., 2620(I) and 2620(J)) that are part of the microphone array (or potentially form their own microphone subarray). Neckband 2605 may also include a controller 2625 and a power source 2635.

Acoustic transducers 2620(I) and 2620(J) of neckband 2605 may be configured to detect sound and convert the detected sound into an electronic format (analog or digital). In the embodiment of FIG. 26, acoustic transducers 2620(I) and 2620(J) may be positioned on neckband 2605, thereby increasing the distance between the neckband acoustic transducers 2620(I) and 2620(J) and other acoustic transducers 2620 positioned on eyewear device 2602. In some cases, increasing the distance between acoustic transducers 2620 of the microphone array may improve the accuracy of beamforming performed via the microphone array. For example, if a sound is detected by acoustic transducers 2620(C) and 2620(D) and the distance between acoustic transducers 2620(C) and 2620(D) is greater than, for example, the distance between acoustic transducers 2620(D) and 2620(E), the determined source location of the detected sound may be more accurate than if the sound had been detected by acoustic transducers 2620(D) and 2620(E).

Controller 2625 of neckband 2605 may process information generated by the sensors on neckband 2605 and/or augmented-reality system 2600. For example, controller 2625 may process information from the microphone array that describes sounds detected by the microphone array. For each detected sound, controller 2625 may perform a direction-of-arrival (DOA) estimation to estimate a direction from which the detected sound arrived at the microphone array. As the microphone array detects sounds, controller 2625 may populate an audio data set with the information.

In embodiments in which augmented-reality system 2600 includes an inertial measurement unit, controller 2625 may compute all inertial and spatial calculations from the IMU located on eyewear device 2602. A connector may convey information between augmented-reality system 2600 and neckband 2605 and between augmented-reality system 2600 and controller 2625. The information may be in the form of optical data, electrical data, wireless data, or any other transmittable data form. Moving the processing of information generated by augmented-reality system 2600 to neckband 2605 may reduce weight and heat in eyewear device 2602, making it more comfortable to the user.

Power source 2635 in neckband 2605 may provide power to eyewear device 2602 and/or to neckband 2605. Power source 2635 may include, without limitation, lithium-ion batteries, lithium-polymer batteries, primary lithium batteries, alkaline batteries, or any other form of power storage. In some cases, power source 2635 may be a wired power source. Including power source 2635 on neckband 2605 instead of on eyewear device 2602 may help better distribute the weight and heat generated by power source 2635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2700 in FIG. 27, that mostly or completely covers a user's field of view. Virtual-reality system 2700 may include a front rigid body 2702 and a band 2704 shaped to fit around a user's head. Virtual-reality system 2700 may also include output audio transducers 2706(A) and 2706(B). Furthermore, while not shown in FIG. 27, front rigid body 2702 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 2600 and/or virtual-reality system 2700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 2600 and/or virtual-reality system 2700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 2600 and/or virtual-reality system 2700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

EXAMPLE EMBODIMENTS

Example 1: A device includes an active photonic circuit including optical switches, a passive photonic circuit configured to receive light from the active photonic circuit and direct the light towards a display, and a control circuit configured to control the optical switches so that an illumination zone of the display is illuminated with a light intensity based on a displayed content shown within the illumination zone.

Example 2: The device of example 1, where the device is a head-mounted device.

Example 3: The device of examples 1-2, where the device is an augmented reality device.

Example 4: The device of examples 1-3, where the device is a virtual reality device.

Example 5: The device of examples 1-4, where the passive photonic circuit includes a waveguide including a light out-coupler configured to direct a portion of the light towards the illumination zone.

Example 6: The device of examples 1-5, where the light out-coupler includes at least one grating.

Example 7: The device of examples 1-6, where the light out-coupler includes an arrangement of scattering particles.

Example 8: The device of examples 1-7, where the active photonic circuit further includes a light input configured to receive the light from a light source.

Example 9: The device of examples 1-8, where: the light includes laser radiation; and the light input is configured to receive the laser radiation from a laser.

Example 10: The device of examples 1-9, where at least one optical switch of the optical switches includes a Mach-Zehnder optical switch.

Example 11: The device of examples 1-10, where at least one optical switch of the optical switches includes a ring resonator.

Example: 12 The device of examples 1-11, where the control circuit includes at least one of electronic bus lines for power distribution, control line configured to control the optical switches, data lines, a display driver circuit, a video signal analyzer, or an electronic circuit configured for active pixel control of the display.

Example 13: A method includes transmitting light through an active photonic circuit including optical switches and having a plurality of light outputs; using a passive photonic circuit, receiving the plurality of light outputs from the active photonic circuit and illuminating zones of a display; and using a control circuit, controlling the optical switches so that each zone of the zones of the display is illuminated with an intensity based on a content shown by the zone of the display.

Example 14: The method of example 13, where the display is a display of a head-mounted device.

Example 15: The method of examples 13-14, where the display is a display of an augmented reality device.

Example 16: The method of examples 13-15, where the display is a display of a virtual reality device.

Example 17: The method of examples 13-16, where the passive photonic circuit includes a waveguide including a light out-coupler configured to direct a portion of the light towards the zone.

Example 18: The method of examples 13-17, where the light out-coupler includes at least one grating.

Example 19: The method of examples 13-18, where the light out-coupler includes an arrangement of scattering particles.

Example 20: A system includes a display including at least one of a reflective display and a transmissive display; an active photonic circuit including optical switches; a passive photonic circuit configured to receive light from the active photonic circuit and direct the light towards the display; and a control circuit configured to control the optical switches so that an illumination zone of the display is illuminated with a light intensity based on a displayed content shown within the illumination zone.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A device comprising:

an active photonic circuit comprising optical switches;

a passive photonic circuit configured to receive light from the active photonic circuit and direct the light towards a display; and a control circuit configured to control the optical switches so that an illumination zone of the display is illuminated with a light intensity based on a displayed content shown within the illumination zone, and to scan light through illumination zones of the display so that a single illumination zone at a time is illuminated, the scan being time synchronized with a raster scan.

2. The device of claim 1, wherein the device is a head-mounted device.

3. The device of claim 1, wherein the device is an augmented reality device.

4. The device of claim 1, wherein the device is a virtual reality device.

5. The device of claim 1, wherein the passive photonic circuit includes a waveguide comprising a light out-coupler configured to direct a portion of the light towards the illumination zone.

6. The device of claim 5, wherein the light out-coupler comprises at least one grating.

7. The device of claim 5, wherein the light out-coupler comprises an arrangement of scattering particles.

8. The device of claim 1, wherein the active photonic circuit further comprises a light input configured to receive the light from a light source.

9. The device of claim 8, wherein:

the light includes laser radiation; and the light input is configured to receive the laser radiation from a laser.

10. The device of claim 1, wherein at least one optical switch of the optical switches comprises a Mach-Zehnder optical switch.

11. The device of claim 1, wherein at least one optical switch of the optical switches comprises a ring resonator.

12. The device of claim 1, wherein the control circuit includes at least one of electronic bus lines for power distribution, control line configured to control the optical switches, data lines, a display driver circuit, a video signal analyzer, or an electronic circuit configured for active pixel control of the display.

13. A method comprising:

transmitting light through an active photonic circuit comprising optical switches and having a plurality of light outputs;

using a passive photonic circuit, receiving the plurality of light outputs from the active photonic circuit and illuminating zones of a display; and using a control circuit, controlling the optical switches so that each zone of the zones of the display is illuminated with an intensity based on a content shown by the zone of the display, and scanning light through illumination zones of the display so that a single illumination zone at a time is illuminated, the scan being time synchronized with a raster scan.

14. The method of claim 13, wherein the display comprises a display of a head-mounted device.

15. The method of claim 13, wherein the display comprises a display of an augmented reality device.

16. The method of claim 13, wherein the display comprises a display of a virtual reality device.

17. The method of claim 13, wherein the passive photonic circuit includes a waveguide comprising a light out-coupler configured to direct a portion of the light towards the zone.

18. The method of claim 17, wherein the light out-coupler comprises at least one grating.

19. The method of claim 17, wherein the light out-coupler comprises an arrangement of scattering particles.

20. A system comprising:

a display comprising at least one of a reflective display and a transmissive display;

an active photonic circuit comprising optical switches;

a passive photonic circuit configured to receive light from the active photonic circuit and direct the light towards the display; and a control circuit configured to control the optical switches so that an illumination zone of the display is illuminated with a light intensity based on a displayed content shown within the illumination zone, and to scan light through illumination zones of the display so that a single illumination zone at a time is illuminated, the scan being time synchronized with a raster scan.

* * * * *